US012811766B2

(12) United States Patent
Matsumoto et al.

(10) Patent No.: US 12,811,766 B2
(45) Date of Patent: Nov. 24, 2026

(54) ON-VEHICLE DEVICE AND TIME SYNCHRONIZATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tadashi Matsumoto, Yokkaichi (JP); Kazuki Kitagawa, Yokkaichi (JP); Kazuyuki Inoue, Yokkaichi (JP); Yojiro Suyama, Osaka (JP); Tatsuya Izumi, Osaka (JP); Hideyuki Tanaka, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 310 days.

(21) Appl. No.: 18/579,609

(22) PCT Filed: Jun. 27, 2022

(86) PCT No.: PCT/JP2022/025511
§ 371 (c)(1),
(2) Date: Jan. 16, 2024

(87) PCT Pub. No.: WO2023/008037
PCT Pub. Date: Feb. 2, 2023

(65) Prior Publication Data
US 2024/0333469 A1 Oct. 3, 2024

(30) Foreign Application Priority Data
Jul. 29, 2021 (JP) ................................ 2021-124058

(51) Int. Cl.
*H04L 7/02* (2006.01)
*H04L 7/00* (2006.01)

(52) U.S. Cl.
CPC .............. *H04L 7/02* (2013.01); *H04L 7/0016* (2013.01)

(58) Field of Classification Search
CPC ........ H04J 3/0667; H04L 7/02; H04L 7/0016; G04G 5/00
See application file for complete search history.

(56) References Cited

U.S. PATENT DOCUMENTS 10,797,854 B1 * 10/2020 Heurtefeux ............ H04L 7/027
2013/0077659 A1 3/2013 Okuda
(Continued)

FOREIGN PATENT DOCUMENTS

CN 113381882 A * 9/2021 ............ H04L 41/12
CN 115276867 A * 11/2022 ........... H04J 3/0638
(Continued)

*Primary Examiner* — Shean Tokuta
(74) *Attorney, Agent, or Firm* — Brooks Kushman P.C.

(57) ABSTRACT

An on-vehicle device includes: a storage unit configured to store delay time information indicating at least either a first transmission delay time of data from a measurement reference position of a transmission time of the data in an own device, which is the on-vehicle device, to an external position, or a second transmission delay time of data from an external position to a measurement reference position of a reception time of the data in the own device; and a transmission processing unit configured to transmit the delay time information stored in the storage unit to a first other device that performs time synchronization with the own device.

8 Claims, 15 Drawing Sheets

(56) References Cited

U.S. PATENT DOCUMENTS

| | | | | |
|---|---|---|---|---|
| 2015/0134764 | A1* | 5/2015 | Noebauer | H04L 7/0037 709/208 |
| 2016/0161261 | A1* | 6/2016 | Lee | G01S 19/48 701/445 |
| 2019/0344735 | A1* | 11/2019 | Granig | G01R 31/007 |
| 2021/0006435 | A1* | 1/2021 | Iwata | H04L 12/40169 |
| 2021/0243707 | A1 | 8/2021 | Ishii | |
| 2022/0150854 | A1* | 5/2022 | Patil | H04J 3/0682 |
| 2024/0333469 | A1* | 10/2024 | Matsumoto | G04G 5/00 |
| 2026/0089663 | A1* | 3/2026 | Fujiwara | H04W 56/0045 |

FOREIGN PATENT DOCUMENTS

| | | | | | |
|---|---|---|---|---|---|
| CN | 117319259 | A | * | 12/2023 | H04L 43/0852 |
| CN | 119945946 | A | * | 5/2025 | |
| DE | 102018213898 | A1 | * | 2/2020 | H04L 43/106 |
| EP | 3985890 | A1 | * | 4/2022 | H04L 7/0331 |
| EP | 2798506 | B1 | * | 10/2022 | H04J 3/0697 |
| JP | 2011199689 | A | * | 10/2011 | |
| JP | 2011217298 | A | * | 10/2011 | |
| JP | 2012253501 | A | * | 12/2012 | |
| JP | 2013017211 | A | * | 1/2013 | |
| JP | 2014023090 | A | * | 2/2014 | |
| JP | 2015164302 | A | * | 9/2015 | |
| JP | 2016-005214 | A | | 1/2016 | |
| JP | 2016184809 | A | * | 10/2016 | |
| JP | 2016197873 | A | * | 11/2016 | |
| JP | 2016-219870 | A | | 12/2016 | |
| JP | 2023019384 | A | * | 2/2023 | H04J 3/0667 |
| JP | 2023161812 | A | * | 11/2023 | |
| WO | WO-2019171669 | A1 | * | 9/2019 | H04L 12/40169 |
| WO | WO-2023282107 | A1 | * | 1/2023 | H04J 3/0667 |
| WO | WO-2023008037 | A1 | * | 2/2023 | H04J 3/0667 |

* cited by examiner

FIG. 10

Sta

| ON-VEHICLE DEVICE | DIRECTION | TRANSMISSION DELAY TIME |
|---|---|---|
| SWITCH DEVICE 101 (COMMUNICATION PORT 54D) | Tx | T62 |
| | Rx | T61 |
| FUNCTIONAL UNIT 111D | Tx | T51 |
| | Rx | T52 |

FIG. 13

Stb

| ON-VEHICLE DEVICE | DIRECTION | TRANSMISSION DELAY TIME |
|---|---|---|
| FUNCTIONAL UNIT 111E | Tx | T82 |
| | Rx | T81 |
| SWITCH DEVICE 101 (COMMUNICATION PORT 54E) | Tx | T71 |
| | Rx | T72 |

ON-VEHICLE DEVICE AND TIME SYNCHRONIZATION METHOD

CROSS-REFERENCE TO RELATED APPLICATIONS

This application is the U.S. national stage of PCT/JP22022/025511 filed on Jun. 27, 2022, which claims priority of Japanese Patent Application 2021-124058 filed on Jul. 29, 2021, the contents of which are incorporated herein.

TECHNICAL FIELD

The present disclosure relates to an on-vehicle device and a time synchronization method.

This application is based upon and claims the benefit of priority from Japanese patent application No. 2021-124058 filed on Jul. 29, 2021 the disclosure of which is incorporated herein in their entirety by reference.

BACKGROUND

The following network system is disclosed in JP 2016-5214A. This network system includes a plurality of nodes that constitute a time synchronization network whose network configuration does not change dynamically, one of the nodes functioning as a master. Each node of the plurality of nodes includes: a storage means for storing synchronization information containing master information indicating the master, and topology information indicating a logical topology of the time synchronization network; and a control means for controlling the node, and the control means forms the time synchronization network by starting up the node, using the synchronization information stored in the storage means as synchronization information for the node in the time synchronization network.

In addition, a technology has been developed to perform time synchronization processing when a specific device synchronizes time information with another device, considering the fact that the time required for the specific device to perform MAC processing varies depending on the system status. For example, the following time synchronization control device is disclosed in JP 2016-219870A. This time synchronization control device includes: a storage unit that, upon receiving an input signal containing first time information received from an external device, stores current time information output from a time output unit, as second time information; and an update unit that updates the current time information output from the time output unit, based on third time information that is the current time information output from the time output unit when a signal processing unit that performs predetermined signal processing on the input signal has finished the signal processing on the input signal, the first time information, and the second time information stored in the storage unit.

Each on-vehicle device in an on-vehicle network periodically calculates the average value of the bidirectional propagation delay times of data transmitted between on-vehicle devices as a theoretical value in accordance with a protocol defined by the IEEE (registered trademark) 802.1 standards, and performs time synchronization among the on-vehicle devices, using the theoretical value of the newly calculated propagation delay time.

However, the propagation delay time of data transmitted in one direction between on-vehicle devices and the propagation delay time of data transmitted in the other direction may be different from each other, and in such a case, the actual value of the propagation delay time is different from the theoretical value of the propagation delay time, resulting in problems such as a decrease in the accuracy of time synchronization.

The present disclosure has been made to solve the aforementioned problems, and an object thereof is to provide an on-vehicle device and a time synchronization method that realize more accurate time synchronization between on-vehicle devices.

SUMMARY

An on-vehicle device according to the present disclosure includes: a storage unit configured to store delay time information indicating at least either a first transmission delay time of data from a measurement reference position of a transmission time of the data in an own device, which is the on-vehicle device, to an external position, or a second transmission delay time of data from an external position to a measurement reference position of a reception time of the data in the own device; and a transmission processing unit configured to transmit the delay time information stored in the storage unit to a first other device that performs time synchronization with the own device.

A time synchronization method of an on-vehicle device according to the present disclosure includes the steps of: acquiring delay time information indicating at least either a first transmission delay time of data from a measurement reference position of a transmission time of the data in an own device, which is the on-vehicle device, to an external position, or a second transmission delay time of data from an external position to a measurement reference position of a reception time of the data in the own device; and transmitting the acquired delay time information to another device that performs time synchronization with the own device.

A time synchronization method according to the present disclosure is a time synchronization method in an on-vehicle communication system that includes a first on-vehicle device and a second on-vehicle device, the time synchronization method includes: a step in which the first on-vehicle device transmits delay time information indicating at least either a first transmission delay time of data from a measurement reference position of a transmission time of the data in the first on-vehicle device to an external position, or a second transmission delay time of data from an external position to a measurement reference position of a reception time of the data in the first on-vehicle device; a step in which the second on-vehicle device receives the delay time information transmitted from the first on-vehicle device; a step in which the second on-vehicle device measures the propagation delay time between the second on-vehicle device and the first on-vehicle device by transmitting and receiving information for time synchronization to and from the first on-vehicle device; a step in which the second on-vehicle device corrects the measured propagation delay time based on the delay time information received from the first on-vehicle device; and a step in which the second on-vehicle device performs time synchronization with the first on-vehicle device based on the corrected propagation delay time.

One aspect of the present disclosure can be realized not only as an on-vehicle device that includes such characteristic processing units, but also as a program for enabling a computer to carry out such characteristic processing. Also, one aspect of the present disclosure can be realized as a semiconductor integrated circuit that realizes a part or the entirety of the onboard device, or can be realized as a system that includes the on-vehicle device.

Effects of the Present Disclosure

With the present disclosure, it is possible to more accurately perform time synchronization between on-vehicle devices.

BRIEF DESCRIPTION OF THE DRAWINGS

FIG. 10 is a diagram showing an example of a table created by the slave functional unit according to the embodiment of the present disclosure.

FIG. 13 is a diagram showing an example of a table created by the switching device according to the embodiment of the present disclosure.

DETAILED DESCRIPTION OF PREFERRED EMBODIMENTS

Figure 1:
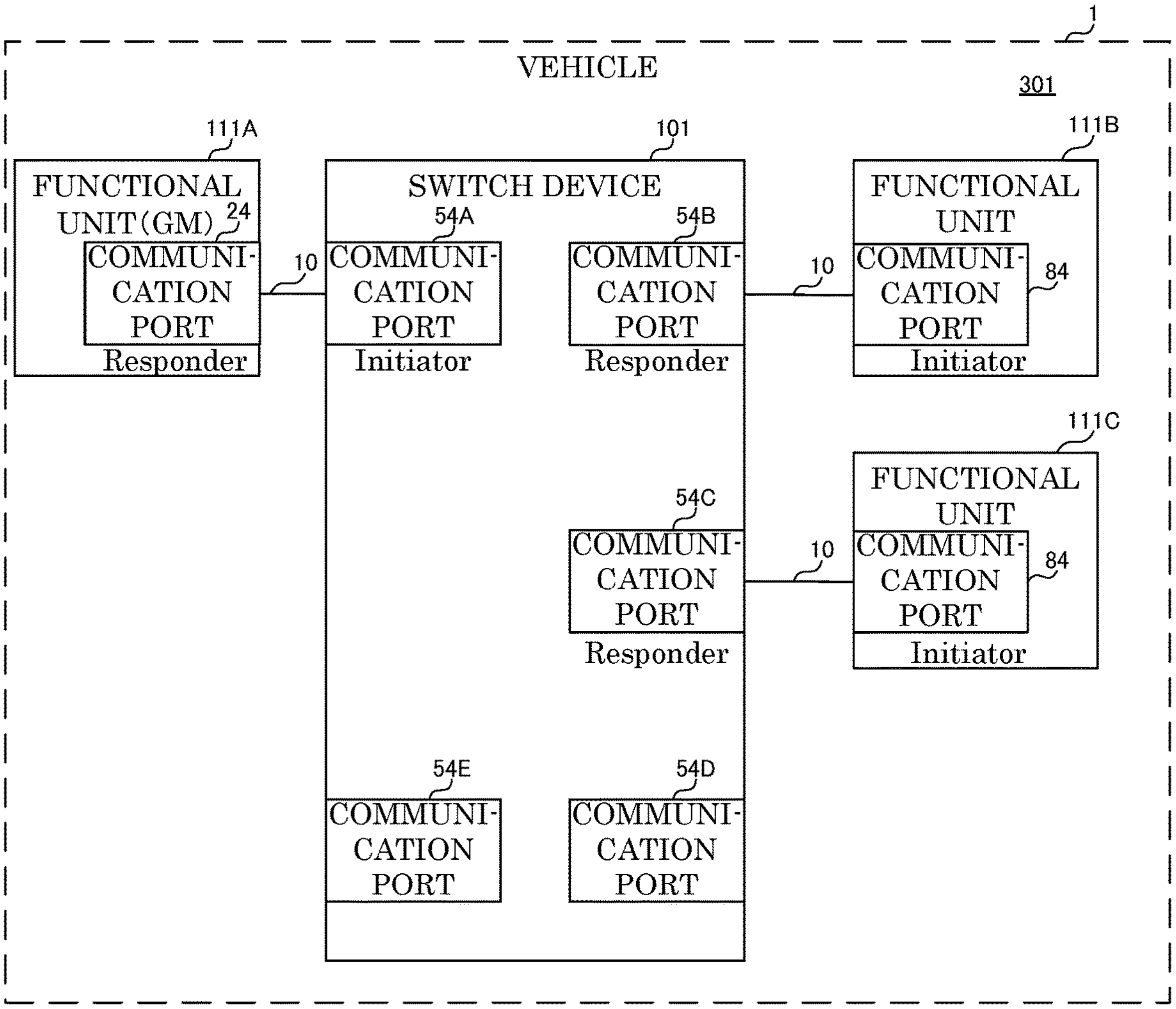
FIG. 1 is a diagram showing the configuration of an on-vehicle communication system according to an embodiment of the present disclosure.

Conventionally, techniques have been developed regarding time synchronization performed among a plurality of devices.

First, the details of an embodiment of the present disclosure are listed and described.

An on-vehicle device according to an embodiment of the present disclosure includes: a storage unit configured to store delay time information indicating at least either a first transmission delay time of data from a measurement reference position of a transmission time of the data in an own device, which is the on-vehicle device, to an external position, or a second transmission delay time of data from an external position to a measurement reference position of a reception time of the data in the own device; and a transmission processing unit configured to transmit the delay time information stored in the storage unit to a first other device that performs time synchronization with the own device.

As described above, with the configuration for transmitting delay time information indicating a data transmission delay time in the own device to another device, the propagation delay time can be corrected in the other device based on the delay time information from the on-vehicle device. Therefore, even if the propagation delay time of data transmitted in one direction and the propagation delay time of data transmitted in the other direction between the on-vehicle devices are different from each other, more accurate time correction can be performed in the other device, using the corrected propagation delay time.

Also, even if the device that is connected to the other device changes dynamically, the other device can acquire delay time information from the newly connected on-vehicle device, and therefore the other device can more accurately perform time correction with the newly-connected on-vehicle device. Therefore, it is possible to more accurately perform time synchronization between on-vehicle devices.

A configuration is possible in which the delay time information indicates both the first transmission delay time and the second transmission delay time.

With such a configuration, in the other device, it is possible to correct the propagation delay time using the transmission delay times on both the transmission side and the reception side of data in the connection-partner on-vehicle device, and it is possible to calculate a more accurate propagation delay time.

A configuration is possible in which each of the measurement reference positions is located between a MAC processing unit that performs MAC (Medium Access Control) layer processing and a PHY processing unit that performs PHY (Physical) layer processing.

With such a configuration, in the other device, it is possible to more appropriately correct the propagation delay time, considering the time required to perform PHY processing on data at the time of transmission or reception of the data by the on-vehicle device to which the other device is connected, for example.

A configuration is possible in which the transmission processing unit transmits the delay time information to the first other device in response to a communication connection being established between the own device and the first other device.

With such a configuration, when another device is newly connected to the on-vehicle device, the delay time information can be transmitted to the other device at a more appropriate time before time synchronization with the on-vehicle device is performed by the other device.

A configuration is possible in which the transmission processing unit transmits information for time synchronization including the delay time information.

With such a configuration, in the other device, there is no need to hold the data transmission delay time in the on-vehicle device to which the other device is to be connected, and when time synchronization with the on-vehicle device is performed using information for time synchronization, a more accurate propagation delay time can be calculated using the delay time information included in the information for time synchronization.

A configuration is possible in which the on-vehicle device further includes a time synchronization unit configured to measure a propagation delay time between the on-vehicle device and the second other device by transmitting and receiving information for time synchronization to and from a second other device, and perform time synchronization with the second other device based on the measured propagation delay time, and the time synchronization unit includes a correction unit configured to correct the propagation delay time based on delay time information indicating at least either a third transmission delay time of data from a measurement reference position of a transmission time of the data in the second other device to an external position, transmitted from the second other device, or a fourth transmission delay time of data from an external position to a measurement reference position of a reception time of the data in the second other device.

Here, between two on-vehicle devices, only one on-vehicle device needs to perform time correction based on the propagation delay time, and the other on-vehicle device need only hold the delay time information from the other on-vehicle device. As described above, due to the configuration with which the on-vehicle device transmits the delay time information held by the on-vehicle device to the first other device, and receives the delay time information held by the second other device from the second other device, for example, if the on-vehicle device has a plurality of communication ports, it is possible to employ a configuration with which, in the case of data transmission and reception using some communication ports, the on-vehicle device performs time correction with the second other device, which is the communication partner, and in the case of data transmission and reception using other communication ports, the first other device, which is the communication partner of the on-vehicle device, performs time correction with the on-vehicle device. Therefore, it is possible to more efficiently realize an on-vehicle network that has the function of performing time correction.

A time synchronization method of an on-vehicle device according to an embodiment of the present disclosure includes the steps of acquiring delay time information indicating at least either a first transmission delay time of data from a measurement reference position of a transmission time of the data in an own device, which is the on-vehicle device, to an external position, or a second transmission delay time of data from an external position to a measurement reference position of a reception time of the data in the own device; and transmitting the acquired delay time information to another device that performs time synchronization with the own device.

As described above, with the method for transmitting delay time information indicating a data transmission delay time in the own device to another device, the propagation delay time can be corrected in the other device based on the delay time information from the on-vehicle device. Therefore, even if the propagation delay time of data transmitted in one direction and the propagation delay time of data transmitted in the other direction between the on-vehicle devices are different from each other, more accurate time correction can be performed in the other device, using the corrected propagation delay time.

Also, even if the device that is connected to the other device changes dynamically, the other device can acquire delay time information from the newly connected on-vehicle device, and therefore the other device can more accurately perform time correction with the newly-connected on-vehicle device. Therefore, it is possible to more accurately perform time synchronization between on-vehicle devices.

A time synchronization method according to an embodiment of the present disclosure is a time synchronization method in an on-vehicle communication system that includes a first on-vehicle device and a second on-vehicle device, the time synchronization method includes: a step in which the first on-vehicle device transmits delay time information indicating at least either a first transmission delay time of data from a measurement reference position of a transmission time of the data in the first on-vehicle device to an external position, or a second transmission delay time of data from an external position to a measurement reference position of a reception time of the data in the first on-vehicle device; a step in which the second on-vehicle device receives the delay time information transmitted from the first on-vehicle device; a step in which the second on-vehicle device measures the propagation delay time between the second on-vehicle device and the first on-vehicle device by transmitting and receiving information for time synchronization to and from the first on-vehicle device; a step in which the second on-vehicle device corrects the measured propagation delay time based on the delay time information received from the first on-vehicle device; and a step in which the second on-vehicle device performs time synchronization with the first on-vehicle device based on the corrected propagation delay time.

With such a configuration, even if the propagation delay time of data transmitted in one direction and the propagation delay time of data transmitted in the other direction between the on-vehicle devices are different from each other, more accurate time correction can be performed in the second on-vehicle device, using the corrected propagation delay time.

Also, even if the device that is connected to the other device changes dynamically, the second on-vehicle device can acquire delay time information from the newly connected on-vehicle device, and therefore the second on-vehicle device can more accurately perform time correction with the newly-connected on-vehicle device. Therefore, it is possible to more accurately perform time synchronization between on-vehicle devices.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

Configuration and Basic Operation

Overall Configuration

FIG. 1 is a diagram showing the configuration of an on-vehicle communication system according to an embodiment of the present disclosure. As shown in FIG. 1, an on-vehicle communication system 301 is provided in a vehicle 1, and includes one or more switching devices 101 and a plurality of functional units 111. FIG. 1 shows one switching device 101, and three functional units 111A, 111B, and 111C, which are provided as functional units 111, for example. The switching device 101 and the functional units

111 are each an on-vehicle device such as an ECU (Electronic Control Unit), for example.

The switching device 101 is connected to the plurality of functional units 111 via Ethernet (registered trademark) cables 10, for example, and is capable of communicating with the functional units 111 connected thereto. For example, the switching device 101 performs relay processing to relay data from one functional unit 111 to another functional unit 111. Information is exchanged between the on-vehicle devices using Ethernet frames in which IP packets are stored, for example.

Examples of the functional units 111 include an external communication ECU, a sensor, a camera, a navigation device, an autonomous driving processing ECU, an ADAS (Advanced Driving Assistant System) ECU, an engine control device, an AT (Automatic Transmission) control device, an HEV (Hybrid Electric Vehicle) control device, a brake control device, a chassis control device, a steering control device, and an instrument display control device.

Switching Device and Master Functional Unit

Configuration of Switching Device

Figure 2:
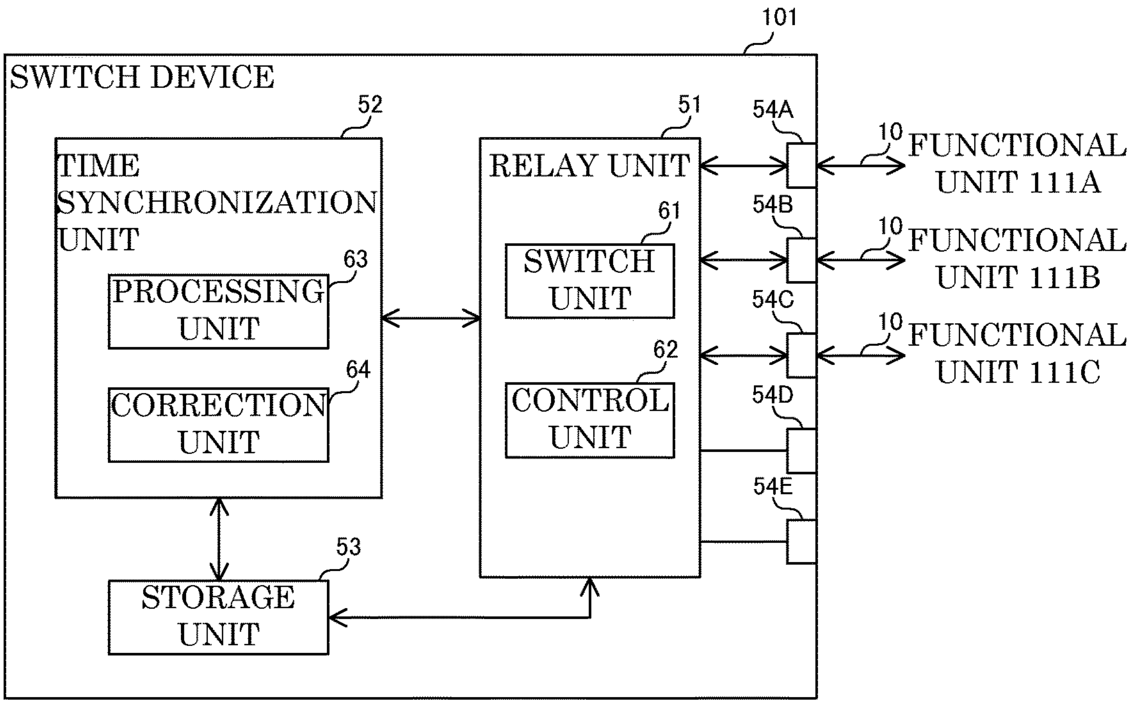
FIG. 2 is a diagram showing the configuration of the switching device according to the embodiment of the present disclosure.

FIG. 2 is a diagram showing the configuration of the switching device according to the embodiment of the present disclosure. As shown in FIG. 2, the switching device 101 includes a relay unit 51, a time synchronization unit (transmission processing unit) 52, a storage unit 53, and communication ports 54A to 54E. Here, it is assumed that the functional units 111A, 111B, and 111C are connected to the communication ports 54A to 53C, respectively, and no on-vehicle device is connected to the communication ports 54D and 54E.

The relay unit 51 and the time synchronization unit 52 are each realized by a processor such as a CPU (Central Processing Unit) or a DSP (Digital Signal Processor), for example. The storage unit 53 is a non-volatile memory, for example. The relay unit 51 includes a switching unit 61 and a control unit 62. The time synchronization unit 52 includes a processing unit 63 and a correction unit 64. Hereinafter, each of the communication ports 54A to 54E may also be simply referred to as a "communication port 54".

Relay Processing by Switching Device

The communication ports 54 serve as an input end and an output end of the switching device 101, and are terminals to which the Ethernet cables 10 can be connected, for example. Note that the communication ports 54 may be integrated circuit terminals.

The storage unit 53 stores an address table At that indicates the correspondence between the port numbers of the communication ports 54 and the MAC (Media Access Control) addresses of connected devices.

The switching unit 61 relays data between a plurality of functional units 111. That is to say, when an Ethernet frame transmitted from one functional unit 111 is received via the communication port 54 that corresponds to the functional unit 111, the switching unit 61 performs relay processing on the received Ethernet frame.

More specifically, the switching unit 61 references the address table At stored in the storage unit 53 and specifies the port number that corresponds to the destination MAC address included in the received Ethernet frame. Thereafter, the switching unit 61 transmits the received Ethernet frame via the communication port 54 that has the specified port number.

Configuration of Master Functional Unit

Figure 3:
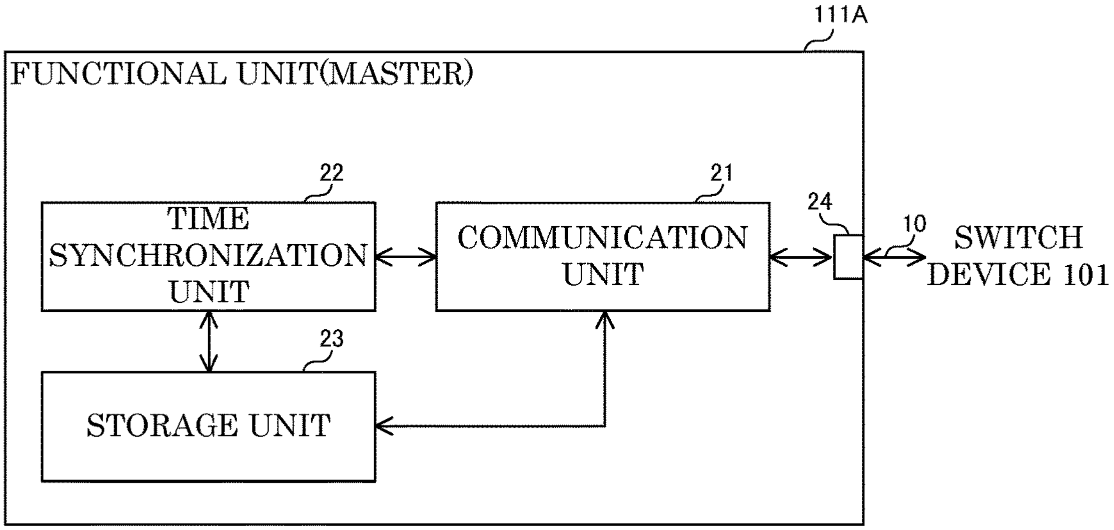
FIG. 3 is a diagram showing the configuration of a master functional unit according to the embodiment of the present disclosure.

FIG. 3 is a diagram showing the configuration of a master functional unit according to the embodiment of the present disclosure. It is assumed that, among the functional units 111A to 111C shown in FIG. 1, the functional unit 111A serves as a master functional unit 111 that holds the reference time for the on-vehicle communication system 301. It is also assumed that the other functional units 111B and 111C serve as slave functional units 111.

As shown in FIG. 3, the master functional unit 111A includes a communication unit 21, a time synchronization unit (transmission processing unit) 22, a storage unit 23, and a communication port 24. The communication unit 21 and the time synchronization unit 22 are each realized by a processor such as a CPU or a DSP, for example. The storage unit 23 is a non-volatile memory, for example.

The communication port 24 serves as an input end and an output end of the functional unit 111A, and is a terminal to which an Ethernet cable 10 can be connected, for example. Note that the communication port 24 may be an integrated circuit terminal or the like. The communication port 24 is connected to the switching device 101 via an Ethernet cable 10.

Figure 4:
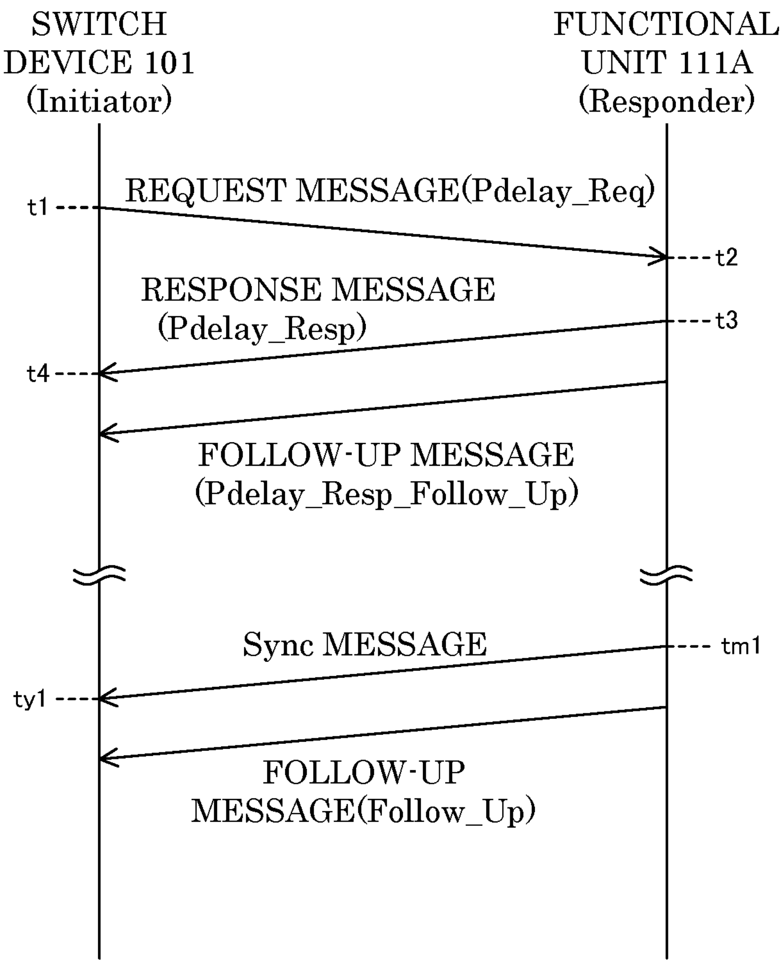
FIG. 4 is a diagram illustrating a calculation method carried out by the switching device according to the embodiment of the present disclosure to calculate the propagation delay time of data transmitted between the master functional unit and the switching device.

Calculation of Propagation Delay Time of Data Transmitted Between Master Functional Unit and Switching Device FIG. 4 is a diagram illustrating a calculation method carried out by the switching device according to the embodiment of the present disclosure to calculate the propagation delay time of data transmitted between the master functional unit and the switching device.

As shown in FIGS. 2 to 4, the switching device 101 transmits and receives time synchronization information to and from the master functional unit 111A in accordance with the IEEE 802.1 standards, for example, to calculate a propagation delay time Td1 of data transmitted between the functional unit 111A and the switching device 101. The switching device 101 performs time synchronization with the functional unit 111A based on the measured propagation delay time Td1.

Of two on-vehicle devices, the one device that performs time correction based on the propagation delay time Td1 is also referred to as an "initiator", and the other device is referred to as a "responder". Here, of the switching device 101 and the functional unit 111A, the switching device 101 is the initiator and the functional unit 111A is the responder.

Specifically, the switching device 101 periodically or irregularly calculates the propagation delay time Td1, and updates the already held propagation delay time Td1 to the newly calculated propagation delay time Td1.

More specifically, the processing unit 63 in the switching device 101 transmits request information (Pdelay_Req) for requesting time information used for updating the propagation delay time Td1, to the functional unit 111A via the relay unit 51 and the communication port 54A. Hereinafter, the request information may also be referred to as a "request message". The control unit 62 in the relay unit 51 stores a transmission time t1 of the request message in the storage unit 53 as a time stamp.

The communication unit 21 in the functional unit 111A receives the request message transmitted from the switching device 101, via the communication port 24, and outputs the received request message to the time synchronization unit 22. The communication unit 21 stores a reception time t2 of the request message in the storage unit 23 as a time stamp.

Upon receiving the request message from the communication unit 21, the time synchronization unit 22 outputs time information (Pdelay_Resp) that corresponds to the request message, to the communication unit 21. The communication unit 21 transmits the time information received from the time synchronization unit 22, to the switching device 101 via the communication port 24. At this time, the time synchronization unit 22 transmits the time information including the reception time t2 of the request message stored in the storage unit 23. Hereinafter, the time information may also be referred to as a "response message". The communication unit 21 stores a transmission time t3 of the response message in the storage unit 23 as a time stamp.

After transmitting the response message, the time synchronization unit 22 transmits a follow-up message (Pdelay_Resp_Follow_Up) including the transmission time t3 of the response message stored in the storage unit 23, to the communication unit 21. The communication unit 21 transmits the follow-up message received from the time synchronization unit 22, to the switching device 101 via the communication port 24.

The control unit 62 in the switching device 101 receives the response message and the follow-up message transmitted from the functional unit 111A, via the communication port 54A. Thereafter, the control unit 62 stores a reception time t4 of the response message in the storage unit 53 as a time stamp. The control unit 62 notifies the time synchronization unit 52 of the time t2 included in the response message and the time t3 included in the follow-up message.

The processing unit 63 in the time synchronization unit 52 calculates the propagation delay time Td1 of data transmitted between the functional unit 111A and the switching device 101 based on the times t2 and t3 notified from the control unit 62 and the times t1 and t4 stored in the storage unit 53. More specifically, the processing unit 63 calculates the average value of the propagation delay times of data in both directions between the switching device 101 and the functional unit 111A as the propagation delay time Td1.

Specifically, the processing unit 63 calculates, as the propagation delay time Td1, the average value of the time from the transmission time t1 at the switching device 101 to the reception time t2 at the functional unit 111A, of the request message; and the time from the transmission time t3 at the functional unit 111A to the reception time t4 at the switching device 101, of the response message, using the expression (1) shown below. Thereafter, the processing unit 63 updates the propagation delay time Td1 stored in the storage unit 53 to the newly calculated propagation delay time Td1.

$$Td1 = ((t4 \cdot t1) \cdot (t3 \cdot t2))/2 \quad (1)$$

Correction of Time in Switching Device

The time synchronization unit 22 in the functional unit 111A periodically or irregularly outputs a Sync message to the communication unit 21. The communication unit 21 transmits the Sync message received from the time synchronization unit 22, to the switching device 101 via the communication port 24. The communication unit 21 stores a transmission time tm1 of the Sync message in the storage unit 23 as a time stamp.

After transmitting the Sync message, the time synchronization unit 22 outputs a follow-up message (Follow_Up) including the time tm1 stored in the storage unit 23, to the communication unit 21. The communication unit 21 transmits the follow-up message received from the time synchronization unit 22, to the switching device 101 via the communication port 24.

The control unit 62 in the switching device 101 receives the Sync message and the follow-up message transmitted from the functional unit 111A, via the communication port 54A. Thereafter, the control unit 62 stores a reception time ty1 of the Sync message in the storage unit 53 as a time stamp. The control unit 62 notifies the time synchronization unit 52 of the time tm1 included in the follow-up message.

The processing unit 63 in the time synchronization unit 52 performs time synchronization with the functional unit 111A based on the time tm1 notified from the control unit 62 and the time ty1 and the propagation delay time Td1 stored in the storage unit 53.

Here, it is assumed that the processing unit 63 calculates a time difference D1=tm1+Td1−ty1, which is the difference between the time in the functional unit 111A and the time in the switching device 101, using the times tm1 and ty1 and the propagation delay time Td1. Thereafter, the processing unit 63 corrects the time in the switching device 101 thereof, using the calculated time difference D1, to establish time synchronization with the functional unit 111A.

Slave Functional Unit

Figure 5:
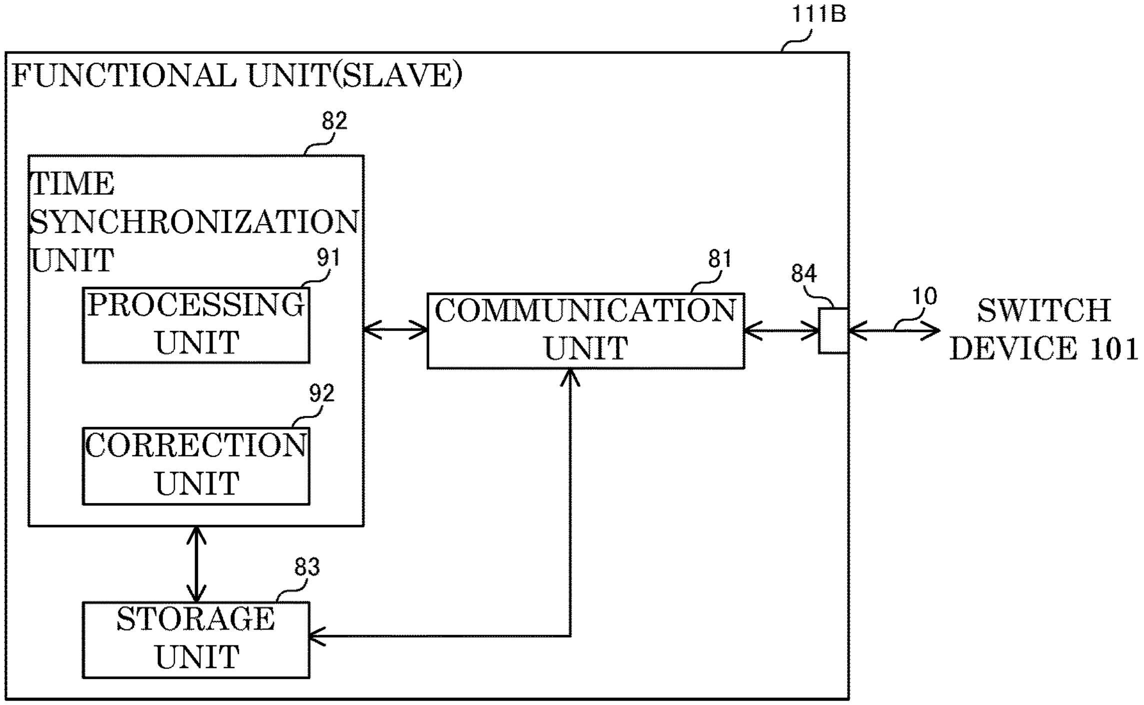
FIG. 5 is a diagram showing the configuration of a slave functional unit according to the embodiment of the present disclosure.

FIG. 5 is a diagram showing the configuration of a slave functional unit according to the embodiment of the present disclosure. Here, the configuration of the functional unit 111B will be described. The configuration of the functional unit 111C is equivalent to the configuration of the functional unit 111B.

As shown in FIG. 5, the slave functional unit 111B includes a communication unit 81, a time synchronization unit (transmission processing unit) 82, a storage unit 83, and a communication port 84. The communication unit 81 and the time synchronization unit 82 are each realized by a processor such as a CPU or a DSP, for example. The storage unit 83 is a non-volatile memory, for example.

The time synchronization unit 82 includes a processing unit 91 and a correction unit 92. The communication port 84 serves as an input end and an output end of the functional unit 111B, and is a terminal to which an Ethernet cable 10 can be connected, for example. Note that the communication port 84 may be an integrated circuit terminal or the like. The communication port 84 is connected to the switching device 101 via an Ethernet cable 10.

Calculation of Propagation Delay Time of Data Transmitted Between Slave Functional Unit and Switching Device Between the slave functional unit 111B and the switching device 101, the functional unit 111B is the initiator and the switching device 101 is the responder. That is to say, the functional unit 111B calculates a propagation delay time Td2 of data transmitted between the switching device 101 and the functional unit 111B.

More specifically, the processing unit 91 in the functional unit 111B periodically or irregularly calculates the propagation delay time Td2 of data transmitted between the switching device 101 and the functional unit 111B, and updates the propagation delay time Td2 stored in the storage unit 83 to the newly calculated propagation delay time Td2. The method carried out by the processing unit 91 to calculate the propagation delay time Td2 is equivalent to the method carried out by the processing unit 63 in the switching device 101 to calculate the propagation delay time Td1 described using FIG. 4.

Thereafter, the processing unit 91 performs time synchronization with the switching device 101 based on the calculated propagation delay time Td2. The time synchronization method carried out by the processing unit 91 is equivalent to the time synchronization method carried out by the processing unit 63 in the switching device 101.

Description of Problems

In each on-vehicle device, at data transmission or reception, an IC (Integrated Circuit) chip that performs PHY (Physical) layer processing such as A/D conversion, or an IC chip that performs MAC layer processing such as processing of MAC addresses stored in Ethernet frames, for example, stores the transmission time or the reception time as a time stamp with respect to the data. Hereinafter, the position that serves as a reference for time stamp measurement may also be simply referred to as a "measurement reference position".

The transmission delay time of data transmitted between the measurement reference position in the on-vehicle device and the outside of the on-vehicle device may vary depending on the vendor, type, or the like of the on-vehicle device. Hereinafter, further details will be described with reference to the drawings.

At Data Transmission from Initiator to Responder

Figure 6:
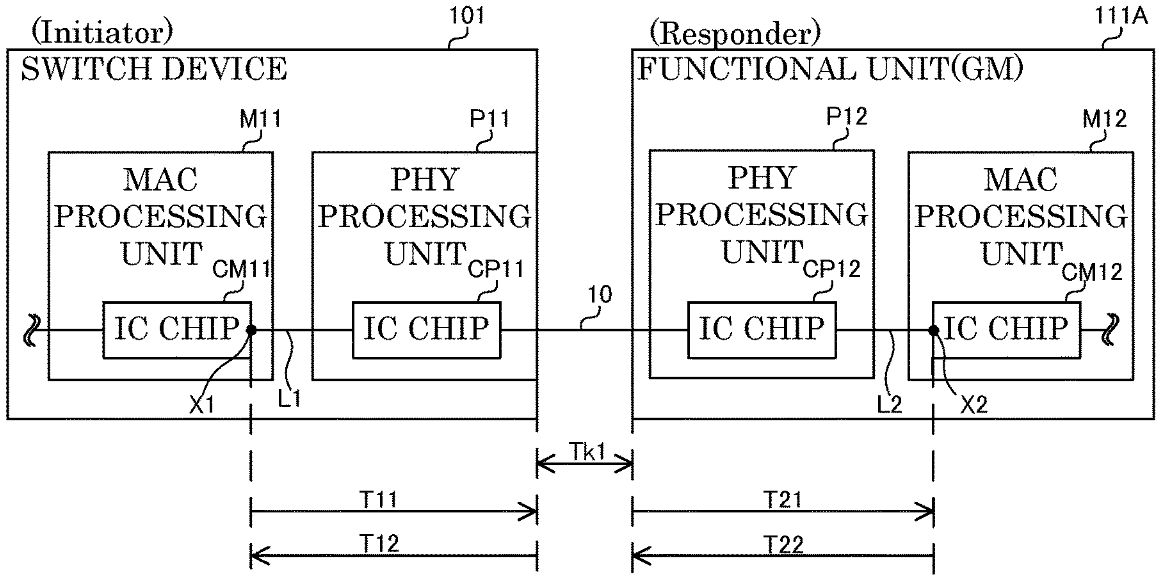
FIG. 6 is a diagram illustrating a data transmission delay time in each of two on-vehicle devices according to the embodiment of the present disclosure.

FIG. 6 is a diagram illustrating a data transmission delay time in each of two on-vehicle devices according to the embodiment of the present disclosure. Here, data transmission delay time in each of the switching device 101 serving as the initiator; and the functional unit 111A serving as the responder will be described.

As shown in FIG. 6, the switching device 101 includes a MAC processing unit M11 and a PHY processing unit P11, which correspond to the communication port 54A. The MAC processing unit M11 includes an IC chip CM11 that performs MAC layer processing. The PHY processing unit P11 includes an IC chip CP11 that performs PHY layer processing. The IC chip CM11 also performs some of the functions of the control unit 62 shown in FIG. 2, for example.

It is assumed that a measurement reference position X1 that corresponds to the communication port 54A in the switching device 101 is located between the IC chip CM11 and the IC chip CP11, specifically at a position between the IC chip CM11 and the IC chip CP11 near the boundary between a data transmission path L1 such as printed circuit board wiring and the IC chip CM11.

The functional unit 111A includes a MAC processing unit M12 and a PHY processing unit P12. The MAC processing unit M12 includes an IC chip CM12 that performs MAC layer processing. The PHY processing unit P12 includes an IC chip CP12 that performs PHY layer processing. The IC chip CM12 also performs some of the functions of the communication unit 21 shown in FIG. 3, for example.

It is assumed that a measurement reference position X2 in the functional unit 111A is located between the IC chip CM12 and the IC chip CP12, specifically at a position between the IC chip CM12 and the IC chip CP12 near the boundary between a data transmission path L2 such as printed circuit board wiring and the IC chip CM12.

When the switching device 101 transmits data to the functional unit 111A, the IC chip CM11 stores the time at which the data passes the measurement reference position X1, i.e., the transmission time at which the data is output to the IC chip CP11, in the storage unit 53 as a time stamp. Thereafter, the IC chip CP11 performs PHY layer processing on the data received from the IC chip CM11, and outputs the data to the outside of the switching device 101 via the communication port 54A. The transmission delay time from when the IC chip CM11 stores the transmission time of data to when the data is output to the outside of the switching device 101, i.e., to when the data is output from the output end of the switching device 101, is represented as "T11".

When the functional unit 111A receives data from the switching device 101, the IC chip CP12 performs PHY layer processing on the data received from the outside via the communication port 24, and outputs the resulting data to the IC chip CM12. The IC chip CM12 stores the time at which data from the IC chip CP12 passes the measurement reference position X2, i.e., the reception time at which the data is received from the IC chip CP12, in the storage unit 23 as a time stamp. The transmission delay time from when the functional unit 111A receives data from the outside through the input end to when the IC chip CM12 stores the reception time of the data is represented as "T21".

At Data Transmission from Responder to Initiator

When the functional unit 111A transmits data to the switching device 101, the IC chip CM12 stores the time at which the data passes the measurement reference position X2, i.e., the transmission time at which the data is output to the IC chip CP12, in the storage unit 23 as a time stamp. Thereafter, the IC chip CP12 performs PHY layer processing on the data received from the IC chip CM12, and outputs the data to the outside of the functional unit 111A via the communication port 24. The transmission delay time from when the IC chip CM12 stores the transmission time of data to when the data is output to the outside of the functional unit 111A, i.e., to when the data is output from the output end of the functional unit 111A, is represented as "T22".

When the switching device 101 receives data from the functional unit 111A, the IC chip CP11 performs PHY layer processing on the data received from the outside via the communication port 54A, and outputs the data to the IC chip CM11. The IC chip CM11 stores the time at which data from the IC chip CP11 passes the measurement reference position X1, i.e., the reception time at which the data is received from the IC chip CP11, in the storage unit 53 as a time stamp. The transmission delay time from when the switching device 101 receives data from the outside through the input end to when the IC chip CM11 stores the reception time of the data is represented as "T12".

Although the switching device 101 has a configuration in which the IC chip CM11 stores the transmission time or reception time of data, the switching device 101 is not limited to such a configuration, and may have a configuration in which the IC chip CP11 stores the transmission time or reception time of data. If this is the case, the measurement reference position X1 is located near the boundary between the IC chip CP11 and the Ethernet cable 10.

Although the functional unit 111A has a configuration in which the IC chip CM12 stores the transmission time or reception time of data, the functional unit 111A is not limited to such a configuration, and may have a configuration in which the IC chip CP12 stores the transmission time or reception time of data. If this is the case, the measurement reference position X2 is located near the boundary between the IC chip CP12 and the Ethernet cable 10.

Relationship Between Theoretical Value of Propagation Delay Time Td1 and Transmission Delay Time Considering Measurement Reference Position The propagation time of data required to pass through the Ethernet cable 10 between the functional unit 111A and the switching device 101 is represented as Tk1. In this case, the time from the transmission time of data at the switching device 101 to the reception time of the data at the functional unit 111A, i.e., a propagation delay time Ttx of the data from the switching device 101 to the functional unit 111A considering the transmission delay time between: the measurement reference positions X1 and X2 in the devices; and an external position is expressed by the expression (2) shown below.

$$Ttx = T11 + Tk1 + T21 \tag{2}$$

The time from the transmission time of data at the functional unit 111A to the reception time of the data at the switching device 101, i.e., a propagation delay time Ttr of the data from the functional unit 111A to the switching device 101 considering the transmission delay time between: the measurement reference positions X1 and X2 in the devices; and an external position is expressed by the expression (3) shown below.

$$Ttr = T22 + Tk1 + T12 \tag{3}$$

As described with reference to FIG. 4, the processing unit 63 in the switching device 101 calculates the average value of the propagation delay times of data transmitted in both directions between the switching device 101 and the functional unit 111A as the theoretical value of the propagation delay time Td1 of data transmitted between the functional unit 111A and the switching device 101.

That is to say, using the times T11, T12, T21, T22, and Tk1 described above, instead of the times t1, t2, t3, and t4 shown in FIG. 4, the theoretical value of the propagation delay time Td1 calculated by the processing unit 63 is expressed by the expression (4) shown below.

$$\begin{aligned} Td1 &= (Ttx + Ttr)/2 \\ &= \{(T11 + Tk1 + T21) + (T22 + Tk1 + T12)\}/2 \end{aligned} \tag{4}$$

Here, the transmission delay time of data transmitted between the measurement reference position in the on-vehicle device and the outside of the on-vehicle device may vary depending on the vendor, type, or the like of the on-vehicle device. Specifically, the transmission delay times T11, T12, T21, and T22 shown in FIG. 5 may vary depending on the venders or the like of the switching device 101 and the functional unit 111A.

In such a case, the propagation delay times Ttx and Ttr of data transmitted in both directions between the switching device 101 and the functional unit 111A are different from each other (Ttx≠Ttr), and the propagation delay times Ttx and Ttr are each different from the theoretical value (=Td1) of the propagation delay times, which is the average value of the propagation delay times Ttx and Ttr (Td1≠Ttx, Td1≠Ttr).

Similarly, between the functional unit 111B and the switching device 101, the propagation delay times Ttx and Ttr of data transmitted in both directions may be different from each other (Ttx≠Ttr). In such a case, the propagation delay times Ttx and Ttr are each different from the theoretical value (=Td2) of the propagation delay times, which is the average value of the propagation delay times Ttx and Ttr (Td2≠Ttx, Td2≠Ttr).

In addition, for example, when a service is added to the vehicle 1, the device to which the on-vehicle device is to be connected may change dynamically. Therefore, it is difficult to store, in advance, in the on-vehicle device, the data transmission delay time of another on-vehicle device to which the on-vehicle device is to be connected. In contrast, with each on-vehicle device in the on-vehicle communication system 301 according to the embodiment of the present disclosure, even if the device to which the on-vehicle device is connected changes dynamically, more accurate propagation delay times can be calculated using the configuration described below.

Time Synchronization Method 1

An on-vehicle device that serves as the responder transmits, to another on-vehicle device that serves as the initiator, delay time information indicating: the transmission delay time of data from the measurement reference position of the transmission time in the on-vehicle device (responder) to an external position, i.e., the output end of the on-vehicle device (responder); and the transmission delay time of data from an external position, i.e., the input end of the on-vehicle device (responder), to the measurement reference position of the reception time in the on-vehicle device (Responder).

Time Synchronization between Master Functional Unit 111A and Switching Device 101

More specifically, again, as shown in FIG. 3, the functional unit 111A has acquired, in advance, delay time information Ix2 indicating: the transmission delay time T21 from an external position to the measurement reference position X2 in the functional unit 111A; and the transmission delay time T22 from the measurement reference position X2 in the functional unit 111A to an external position. That is to say, the storage unit 23 in the functional unit 111A stores the delay time information Ix2.

For example, the functional unit 111A serving as the responder transmits information for time synchronization including the delay time information Ix2 to the switching device 101 serving as the initiator. Specifically, for example, each time the time synchronization unit 22 in the functional unit 111A transmits the follow-up message shown in FIG. 4 to the switching device 101, the time synchronization unit 22 outputs the follow-up message including the delay time information Ix2 stored in the storage unit 23 in the payload part of the message, to the communication unit 21. Thereafter, the communication unit 21 transmits the follow-up message received from the time synchronization unit 22, to the switching device 101 via the communication port 24.

The switching device 101 has acquired, in advance, delay time information Ix1 indicating: the transmission delay time T11 from the measurement reference position X1 in the switching device 101 to an external position, corresponding to the communication port 54A; and the transmission delay time T12 from an external position to the measurement reference position X1 in the switching device 101, corresponding to the communication port 54A. That is to say, the storage unit 53 in the switching device 101 stores the delay time information Ix1.

As described above, the control unit 62 in the switching device 101 receives the Sync message and the follow-up message transmitted from the functional unit 111A, via the communication port 54A. Thereafter, the control unit 62 stores the reception time ty1 of the Sync message in the storage unit 53 as a time stamp. The control unit 62 notifies the time synchronization unit 52 of the time tm1 included in the follow-up message. The control unit 62 outputs the delay time information Ix2 included in the received follow-up message to the time synchronization unit 52.

The correction unit 64 in the time synchronization unit 52 corrects the propagation delay time Td1 calculated by the processing unit 63, based on the transmission delay times T21 and T22 indicated by the delay time information Ix2 received from the control unit 62 and the transmission delay times T11 and T12 indicated by the delay time information Ix1 stored in the storage unit 53.

More specifically, as shown in the expression (5) shown below, it is assumed that the value obtained by subtracting a correction value Cv from the propagation delay time Td1 calculated by the processing unit 63 is the propagation delay time Ttx at the time when a message is transmitted from the switching device 101 to the functional unit 111A. Also, as shown in the expression (6) shown below, it is assumed that the value obtained by adding the correction value Cv to the propagation delay time Td1 is the propagation delay time Ttr at the time when a message is transmitted from the functional unit 111A to the switching device 101.

$$Ttx = Td1 \cdot Cv \tag{5}$$

$$Ttr = Td1 + Cv \tag{6}$$

In this case, the correction value Cv is expressed by the expression (7) shown below.

$$\begin{aligned} Cv &= Td1 \cdot Ttx \qquad (7) \\ &= \{(T11 + Tk1 + T21) + (T22 + Tk1 + T12)\}/2 \cdot (T11 + Tk1 + T21) \\ &= \{(T22 \cdot T11) + (T12 \cdot T21)\}/2 \end{aligned}$$

For example, the correction unit 64 uses the expression (7) to calculate the correction value Cv and corrects the propagation delay time Td1 by subtracting the correction value Cv from the propagation delay time Td1. Thereafter, the correction unit 64 notifies the processing unit 63 of the propagation delay time Ttx, which is the corrected propagation delay time (Td1–Cv), as being the propagation delay time of transmitting data to the functional unit 111A.

Also, the correction unit 64 corrects the propagation delay time Td1 by adding the correction value Cv to the propagation delay time Td1. Thereafter, the correction unit 64 notifies the processing unit 63 of the propagation delay time Ttr, which is the corrected propagation delay time (Td1+Cv), as being the propagation delay time of receiving data from the functional unit 111A.

The processing unit 63 stores the propagation delay times Ttx and Ttr notified from the correction unit 64 in the storage unit 53. For example, as shown in FIG. 4, the processing unit 63 uses the transmission time tm1 of the Sync message at the functional unit 111A notified from the control unit 62 and the reception time ty1 of the Sync message stored in the storage unit 53 as well as the propagation delay time Ttr stored in the storage unit 53, to calculate a time difference D1 between the time in the functional unit 111A and the time in the switching device 101.

Specifically, the processing unit 63 calculates the time difference D1=tm1+Ttr–ty1. Thereafter, the processing unit 63 corrects the time in the switching device 101 thereof, using the calculated time difference D1, to establish time synchronization with the functional unit 111A.

Note that the processing unit 63 may use the propagation delay time Ttx instead of the propagation delay time Ttr to perform time synchronization. For example, the processing unit 63 may use the transmission time at the switching device 101 of a message from the switching device 101 to the functional unit 111A, the reception time of the message at the functional unit 111A, and the propagation delay time Ttx stored in the storage unit 53 to calculate the time difference D1 between the time in the functional unit 111A and the time in the switching device 101.

Figure 7:
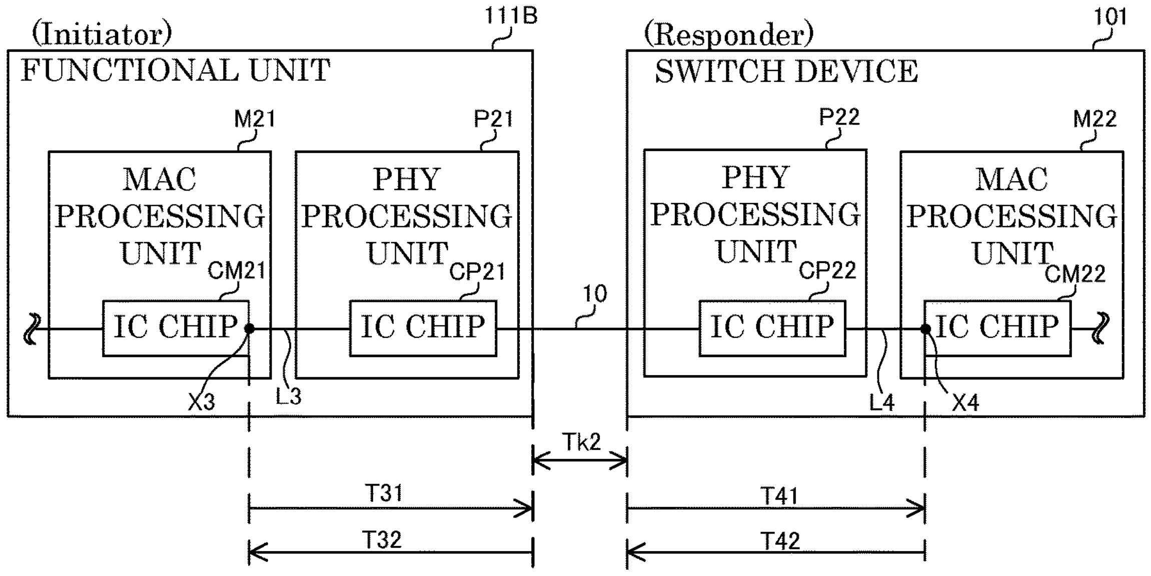
FIG. 7 is a diagram illustrating a data transmission delay time in each of the slave functional unit; and the switching device according to the embodiment of the present disclosure.

Time Synchronization between Switching Device 101 and Slave Functional Unit 111B FIG. 7 is a diagram illustrating a data transmission delay time in each of the slave functional unit; and the switching device according to the embodiment of the present disclosure. As shown in FIG. 7, the functional unit 111B serving as the initiator includes a MAC processing unit M21 and a PHY processing unit P21. The MAC processing unit M21 includes an IC chip CM21 that performs MAC layer processing. The PHY processing unit P21 includes an IC chip CP21 that performs PHY layer processing. The IC chip CM21 also performs some of the functions of the communication unit 81 shown in FIG. 5, for example.

It is assumed that a measurement reference position X3 in the functional unit 111B is located between the IC chip CM21 and the IC chip CP21, specifically at a position between the IC chip CM21 and the IC chip CP21 near the boundary between a data transmission path L3 such as printed circuit board wiring and the IC chip CM21.

The switching device 101 serving as the responder includes a MAC processing unit M22 and a PHY processing unit P22, which correspond to the communication port 54B. The MAC processing unit M22 includes an IC chip CM22 that performs MAC layer processing. The PHY processing unit P22 includes an IC chip CP22 that performs PHY layer processing. The IC chip CM22 also performs some of the functions of the control unit 62 shown in FIG. 2, for example.

It is assumed that a measurement reference position X4 that corresponds to the communication port 54B in the switching device 101 is located between the IC chip CM22 and the IC chip CP22, specifically at a position between the IC chip CM22 and the IC chip CP22 near the boundary between a data transmission path L4 such as printed circuit board wiring and the IC chip CM22.

The storage unit 53 in the switching device 101 stores, in addition to the delay time information Ix1 described above, delay time information Ix4 indicating: a transmission delay time T42 from the measurement reference position X4 in the switching device 101 to an external position, i.e., the output end of the switching device 101, corresponding to the communication port 54B; and a transmission delay time T41 from an external position, i.e., the input end of the switching device 101, to the measurement reference position X4 in the switching device 101, corresponding to the communication port 54B.

For example, the switching device 101 serving as the responder transmits information for time synchronization including the delay time information Ix4 to the functional unit 111B serving as the initiator. Specifically, for example, each time the processing unit 63 in the switching device 101 transmits the follow-up message to the functional unit 111B, the processing unit 63 outputs the follow-up message including the delay time information Ix4 stored in the storage unit 53 in the payload part of the message, to the relay unit 51. Thereafter, the relay unit 51 transmits the follow-up message received from the processing unit 63, to the functional unit 111B via the communication port 84.

The storage unit 83 in the functional unit 111B stores delay time information Ix3 indicating: a transmission delay time T31 from the measurement reference position X3 in the functional unit 111B to an external position, i.e., the output end of the functional unit 111B; and a transmission delay time T32 from an external position, i.e., the input end of the functional unit 111B, to the measurement reference position X3 in the functional unit 111B.

In the functional unit 111B, the communication unit 81 receives the Sync message and the follow-up message transmitted from the switching device 101, via the communication port 84. Thereafter, the communication unit 81 stores a reception time ty2 of the Sync message in the storage unit 83 as a time stamp. The communication unit 81 notifies the time synchronization unit 82 of the time tm2 included in the follow-up message. The communication unit 81 outputs the delay time information Ix4 included in the received follow-up message to the time synchronization unit 82.

The correction unit 92 in the time synchronization unit 82 corrects the propagation delay time Td2 calculated by the processing unit 91, based on the transmission delay times T41 and T42 indicated by the delay time information Ix4 received from the communication unit 81 and the transmission delay times T31 and T32 indicated by the delay time information Ix3 stored in the storage unit 83.

More specifically, as with the correction unit 64 in the switching device 101, the correction unit 92 calculates the correction value Cv and corrects the propagation delay time Td2 by subtracting the correction value Cv from the propagation delay time Td2. Thereafter, the correction unit 92 notifies the processing unit 91 of the propagation delay time Ttx, which is the corrected propagation delay time (Td2−Cv), as being the propagation delay time of transmitting a message to the switching device 101.

Also, the correction unit 92 corrects the propagation delay time Td2 by adding the correction value Cv to the propagation delay time Td2. Thereafter, the correction unit 92 notifies the processing unit 91 of the propagation delay time Ttr, which is the corrected propagation delay time (Td2+Cv), as being the propagation delay time of receiving a message from the switching device 101.

The processing unit 91 stores the propagation delay times Ttx and Ttr notified from the correction unit 92 in the storage unit 83. For example, the processing unit 91 uses the transmission time tm2 of the Sync message at the switching device 101 and the reception time ty2 of the Sync message as well as the propagation delay time Ttr, to calculate a time difference D2 between the time in the switching device 101 and the time in the functional unit 111B.

Specifically, the processing unit 91 calculates the time difference D2=tm2+Ttr−ty2, and corrects the time in the functional unit 111B thereof, using the calculated time difference D2, to establish time synchronization with the switching device 101.

Here, if time synchronization between the master functional unit 111A and the switching device 101 has been established, the time included in the follow-up message transmitted from the switching device 101 to the functional unit 111B is the time synchronized with the functional unit 111A. Therefore, as a result of the processing unit 91 in the functional unit 111B performing time correction, time synchronization is established between the functional unit 111B and the switching device 101, and accordingly time synchronization between the functional unit 111B and the functional unit 111A is established.

Time Synchronization Method 2

According to the method 1 described above, the on-vehicle device serving as the responder periodically or irregularly transmits delay time information to the on-vehicle device serving as the initiator. Thereafter, upon receiving the delay time information, the on-vehicle device serving as the initiator corrects the propagation delay time, using the newly received delay time information.

In contrast, according to the method 2, for example, if an on-vehicle device is connected to another on-vehicle device by plug-and-play, one on-vehicle device that serves as the responder transmits delay time information to the other on-vehicle device that serves as the initiator. The other on-vehicle device holds the delay time information transmitted from the on-vehicle device serving as the responder, and, for example, each time the other on-vehicle device performs time synchronization with the on-vehicle device, the other on-vehicle device corrects the propagation delay time, using the held delay time information.

Figure 8:
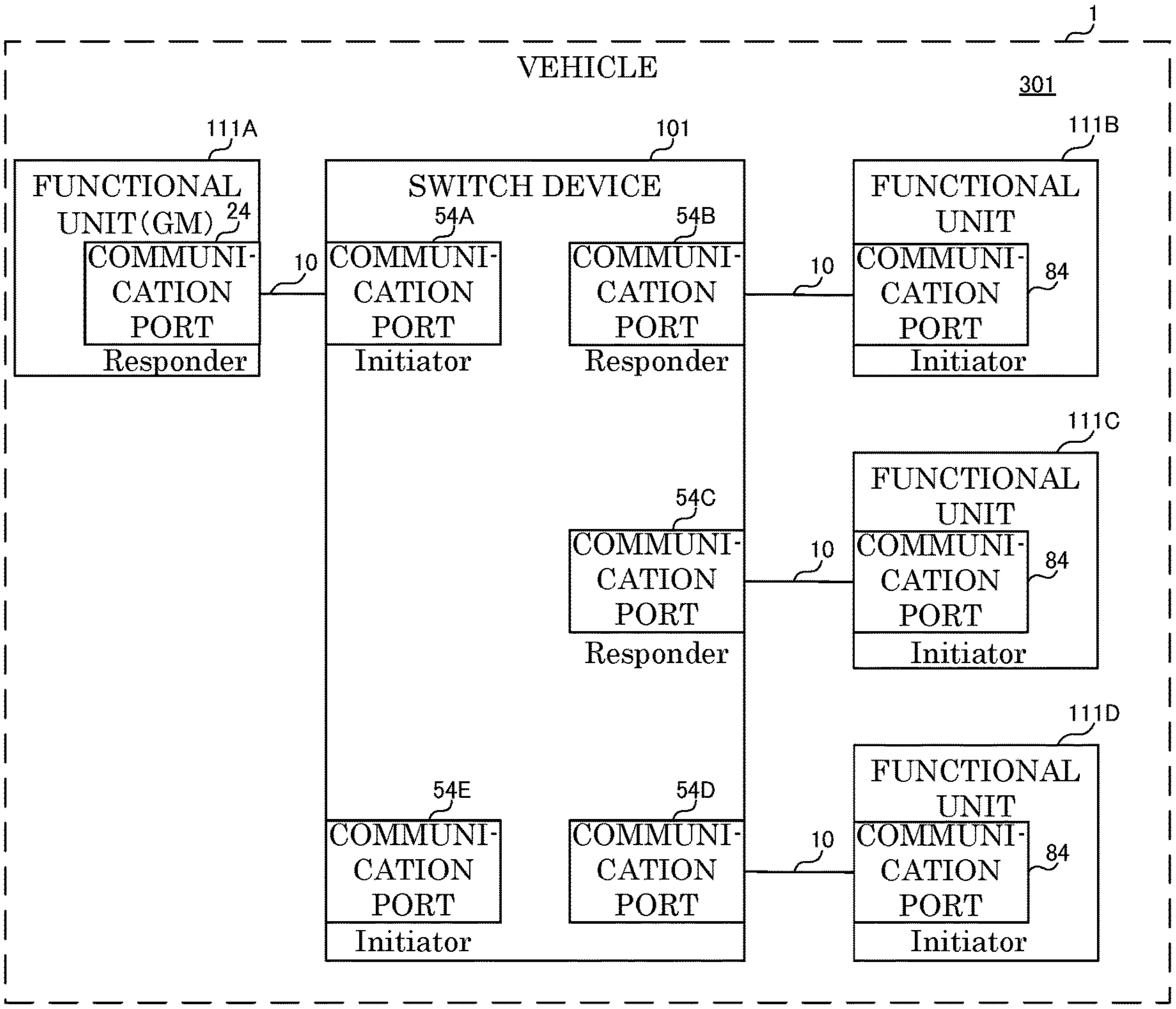
FIG. 8 is a diagram illustrating the time synchronization method 2 in the on-vehicle communication system according to the embodiment of the present disclosure.

Time Synchronization between Switching Device 101 and Newly Connected Slave Functional Unit 111D FIG. 8 is a diagram illustrating the time synchronization method 2 in the on-vehicle communication system according to the embodiment of the present disclosure. Hereinafter, a case in which the slave functional unit 111D is newly connected to the communication port 54D of the switching device 101 will be described with reference to FIG. 8. The functional unit 111D has a configuration equivalent to the configuration of the functional unit 111B shown in FIG. 5, and includes the communication unit 81, the time synchronization unit 82, the storage unit 83, and the communication port 84.

Figure 9:
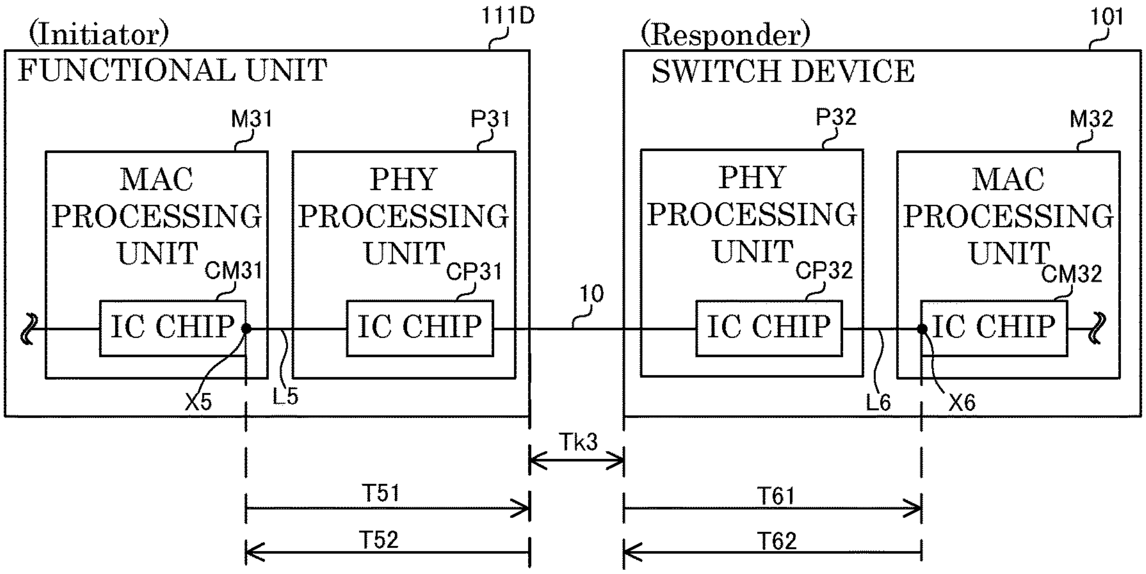
FIG. 9 is a diagram illustrating a data transmission delay time in each of the newly-connected slave functional unit; and the switching device according to the embodiment of the present disclosure.

FIG. 9 is a diagram illustrating a data transmission delay time in each of the newly-connected slave functional unit; and the switching device according to the embodiment of the present disclosure. As shown in FIG. 9, the functional unit 111D serving as the initiator includes a MAC processing unit M31 and a PHY processing unit P31. The MAC processing unit M31 includes an IC chip CM31 that performs MAC layer processing. The PHY processing unit P31 includes an IC chip CP31 that performs PHY layer processing. The IC chip CM31 also performs some of the functions of the communication unit 81 in the functional unit 111D, for example.

It is assumed that a measurement reference position X5 in the functional unit 111D is located between the IC chip CM31 and the IC chip CP31, specifically at a position between the IC chip CM31 and the IC chip CP31 near the boundary between a data transmission path L5 such as printed circuit board wiring and the IC chip CM31.

The switching device 101 serving as the responder includes a MAC processing unit M32 and a PHY processing unit P32, which correspond to the communication port 54D. The MAC processing unit M32 includes an IC chip CM32 that performs MAC layer processing. The PHY processing unit P32 includes an IC chip CP32 that performs PHY layer processing. The IC chip CM32 also performs some of the functions of the control unit 62 shown in FIG. 2, for example.

It is assumed that a measurement reference position X6 that corresponds to the communication port 54D in the switching device 101 is located between the IC chip CM32 and the IC chip CP32, specifically at a position between the IC chip CM32 and the IC chip CP32 near the boundary between a data transmission path L6 such as printed circuit board wiring and the IC chip CM32.

The storage unit 53 in the switching device 101 stores, in addition to the pieces of delay time information Ix1 and Ix4 described above, delay time information Ix6 indicating: a transmission delay time T62 from the measurement reference position X6 in the switching device 101 to an external position, i.e., the output end of the switching device 101, corresponding to the communication port 54D; and a transmission delay time T61 from an external position, i.e., the input end of the switching device 101, to the measurement reference position X6 in the switching device 101, corresponding to the communication port 54D.

The storage unit 83 in the functional unit 111D stores delay time information Ix5 indicating: a transmission delay time T52 from an external position, i.e., the input end of the functional unit 111D, to the measurement reference position X5 in the functional unit 111D; and a transmission delay time T51 from the measurement reference position X5 in the functional unit 111D to an external position, i.e., the output end of the functional unit 111D.

For example, if the slave functional unit 111D is newly connected to the communication port 54D of the switching device 101, processing is performed to establish a communication connection between the switching device 101 and the functional unit 111D.

Thereafter, for example, in response to the communication connection between the switching device 101 and the functional unit 111D being established, the processing unit 63 in the switching device 101 serving as the responder transmits a message that employs SOME/IP (Scalable Service-Oriented Middleware over IP), including the delay time information Ix6 in the payload part of the message, to the functional unit 111D serving as the initiator.

In the functional unit 111D, upon receiving the delay time information Ix6 included in the message transmitted from the switching device 101, via the communication port 84, the communication unit 81 stores the delay time information Ix6 in the storage unit 83. For example, upon confirming that the delay time information Ix6 has been stored in the storage unit 83, the correction unit 92 in the time synchronization unit 82 creates a table Sta showing transmission delay times in both directions for each of the functional unit 111D; and the switching device 101, based on the delay time information Ix5 and the delay time information Ix6 stored in the storage unit 83.

FIG. 10 is a diagram showing an example of a table created by the slave functional unit according to the embodiment of the present disclosure. As shown in FIG. 10, the correction unit 92 in the functional unit 111D creates the table Sta showing the transmission delay times T51 and T52 indicated by the delay time information Ix5 and the transmission delay times T61 and T62 indicated by the delay time information Ix6, and stores the created table Sta in the storage unit 83.

As with the processing unit 91 in the functional unit 111B shown in FIG. 5, the processing unit 91 in the functional unit 111D periodically or irregularly calculates a propagation delay time Td3 of data transmitted between the switching device 101 and the functional unit 111D. The correction unit 92 corrects the propagation delay time Td3 calculated by the processing unit 91, based on the transmission delay times T51, T52, T61, and T62 shown in the table Sta stored in the storage unit 83. Thereafter, the processing unit 91 performs time correction with the switching device 101 based on the propagation delay time Td3 corrected by the correction unit 92.

The method for correcting the propagation delay time Td3 and the method for correcting the time in relation to the switching device 101, performed by the correction unit 92 in the functional unit 111D, are equivalent to the method for correcting the propagation delay time Td2 and the method for correcting the time in relation to the switching device 101, performed by the correction unit 92 in the functional unit 111B, respectively.

Figure 11:
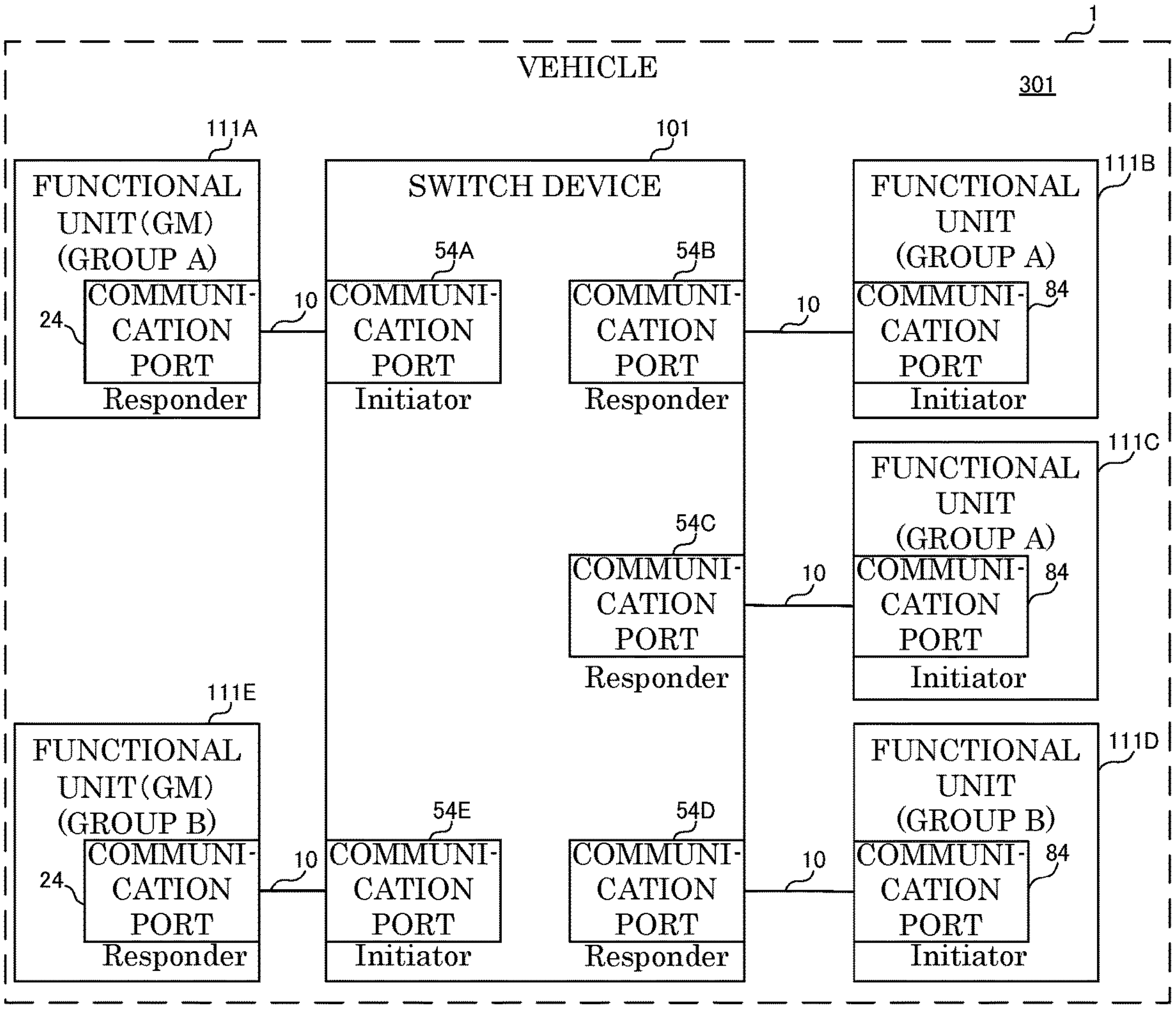
FIG. 11 is a diagram illustrating the time synchronization method 2 in the on-vehicle communication system according to the embodiment of the present disclosure.

Time Synchronization Between Switching Device 101 and Newly Connected Master Functional Unit 111E FIG. 11 is a diagram illustrating the time synchronization method 2 in the on-vehicle communication system according to the embodiment of the present disclosure. Hereinafter, time synchronization between the switching device 101 and the functional unit 111E in the case where the slave functional unit 111D is newly connected to the communication port 54D of the switching device 101 and furthermore the master functional unit 111E is newly connected to the communication port 54E of the switching device 101 will be described with reference to FIG. 11. Note that the time synchronization between the switching device 101 and the functional unit 111D is as described above.

The functional unit 111E has the same configuration as the functional unit 111A shown in FIG. 3, and includes the communication unit 21, the time synchronization unit 22, the storage unit 23, and the communication port 24. It is assumed that the functional units 111A, 111B, and 111C that are already connected to the switching device 101 are included in a group A, and the functional units 111D and 111E that are to be newly connected to the switching device 101 are included in a group B. Time synchronization is performed between the on-vehicle devices included in the group A, and time synchronization is performed between the on-vehicle devices included in the group B.

Figure 12:
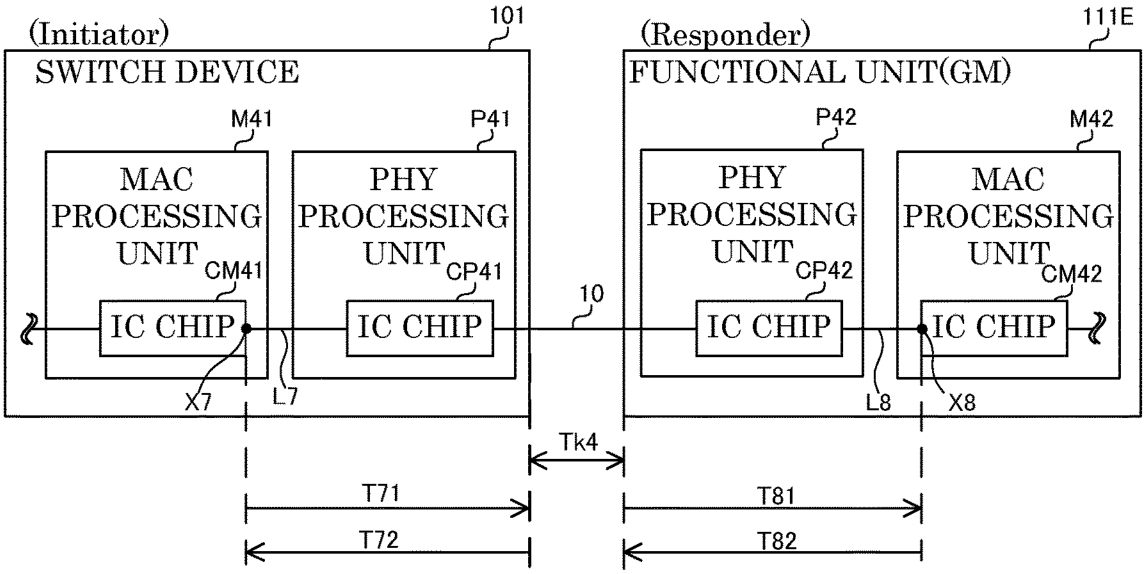
FIG. 12 is a diagram illustrating a data transmission delay time in each of the newly-connected master functional unit; and the switching device according to the embodiment of the present disclosure.

FIG. 12 is a diagram illustrating a data transmission delay time in each of the newly-connected master functional unit; and the switching device according to the embodiment of the present disclosure. As shown in FIG. 12, the switching device 101 serving as the initiator includes a MAC processing unit M41 and a PHY processing unit P41, which correspond to the communication port 54E. The MAC processing unit M41 includes an IC chip CM41 that performs MAC layer processing. The PHY processing unit P41 includes an IC chip CP41 that performs PHY layer processing. The IC chip CM41 also performs some of the functions of the control unit 62 shown in FIG. 2, for example.

It is assumed that a measurement reference position X7 in the switching device 101 is located between the IC chip CM41 and the IC chip CP41, specifically at a position between the IC chip CM41 and the IC chip CP41 near the boundary between a data transmission path L7 such as printed circuit board wiring and the IC chip CM41.

The functional unit 111E serving as the responder includes a MAC processing unit M42 and a PHY processing unit P42. The MAC processing unit M42 includes an IC chip CM42 that performs MAC layer processing. The PHY processing unit P42 includes an IC chip CP42 that performs PHY layer processing. The IC chip CM42 also performs some of the functions of the communication unit 21 in the functional unit 111D, for example.

It is assumed that a measurement reference position X8 in the functional unit 111E is located between the IC chip CM42 and the IC chip CP42, specifically at a position between the IC chip CM42 and the IC chip CP42 near the boundary between a data transmission path L8 such as printed circuit board wiring and the IC chip CM42.

The storage unit 53 in the switching device 101 stores, in addition to the pieces of delay time information Ix1, Ix4, and Ix6 described above, delay time information Ix7 indicating: a transmission delay time T71 from the measurement reference position X7 in the switching device 101 to an external position, i.e., the output end of the switching device 101, corresponding to the communication port 54E; and a transmission delay time T72 from an external position, i.e., the input end of the switching device 101, to the measurement reference position X7 in the switching device 101, corresponding to the communication port 54E.

The storage unit 23 in the functional unit 111E stores delay time information Ix8 indicating: a transmission delay time T81 from an external position, i.e., the input end of the functional unit 111E, to the measurement reference position X8 in the functional unit 111E; and a transmission delay time T82 from the measurement reference position X8 in the functional unit 111E to an external position, i.e., the output end of the functional unit 111E.

For example, if the master functional unit 111E is newly connected to the communication port 54E of the switching device 101, processing is performed to establish a communication connection between the switching device 101 and the functional unit 111E.

Thereafter, for example, in response to the communication connection between the switching device 101 and the functional unit 111E being established, the time synchronization unit 82 in the functional unit 111E serving as the responder transmits a message that employs SOME/IP, including the delay time information Ix8 in the payload part of the message, to the switching device 101 serving as the initiator.

Upon receiving the delay time information Ix8 transmitted from the functional unit 111E, via the communication port 54E, the control unit 62 in the switching device 101 stores the delay time information Ix8 in the storage unit 53. For example, upon confirming that the delay time information Ix8 has been stored in the storage unit 53, the correction unit 64 creates a table Stb showing transmission delay times in both directions for each of the functional unit 111E; and the switching device 101, based on the delay time information Ix7 and the delay time information Ix8 stored in the storage unit 53.

FIG. 13 is a diagram showing an example of a table created by the switching device according to the embodiment of the present disclosure. As shown in FIG. 13, the control unit 62 creates the table Stb showing the transmission delay times T71 and T72 indicated by the delay time information Ix7 and the transmission delay times T81 and T82 indicated by the delay time information Ix8, and stores the created table Stb in the storage unit 53.

The processing unit 63 in the switching device 101 periodically or irregularly calculates a propagation delay time Td4 of data transmitted between the functional unit 111E and the switching device 101. The correction unit 64 corrects the propagation delay time Td4 calculated by the processing unit 63, based on the transmission delay times T71, T72, T81, and T82 shown in the table Stb stored in the storage unit 53. Thereafter, the processing unit 63 performs time correction with the functional unit 111E based on the propagation delay time Td4 corrected by the correction unit 64. The method for correcting the propagation delay time Td4 and the method for correcting the time in relation to the functional unit 111E carried out by the correction unit 64 in the switching device 101 are equivalent to the method for correcting the propagation delay time Td1 and the method for correcting the time in relation to the functional unit 111A carried out by the correction unit 64, respectively.

Note that the delay time information held in each on-vehicle device does not necessarily have a configuration for indicating both the transmission delay time of data from the measurement reference position of the transmission time in the on-vehicle device to an external position, i.e., the transmission delay time at the transmission of the data, and the transmission delay time of data from an external position to the measurement reference position of the reception time in the on-vehicle device, i.e. the transmission delay time at the reception of the data, and the delay time information may indicate either one of the transmission delay times.

Here, in on-vehicle devices, the transmission delay time at the reception of data is often longer than the transmission delay time at the transmission of data. That is to say, the transmission delay time at the reception of data may have a greater influence on the length of the propagation delay time than the transmission delay time at the transmission of data. In such a case, it is preferable that the delay time information indicates the transmission delay time at the reception of data.

In addition, in the on-vehicle communication system 301 shown in FIG. 1, at least either the initiator or the responder is the switching device 101, but the present invention is not limited to such a configuration. That is to say, both the initiator and the responder may be functional units 111.

Operation Flow

Next, operations performed when the on-vehicle devices in the on-vehicle communication system 301 perform time synchronization will be described with reference to the drawings.

The devices in the on-vehicle communication system 301 each have a computer that includes a memory, and in each of such devices, an arithmetic processing unit such as a CPU in the computer reads out, from the memory, a program that includes part or all of the steps of the flowchart described below, and executes the program. The programs executed by the devices can be installed from an external source. The programs executed by the devices are distributed in a state of being stored in recording media or distributed via a communication line.

Time Synchronization Between Master Functional Unit and Switching Device Performed Using Method 1

Figure 14:
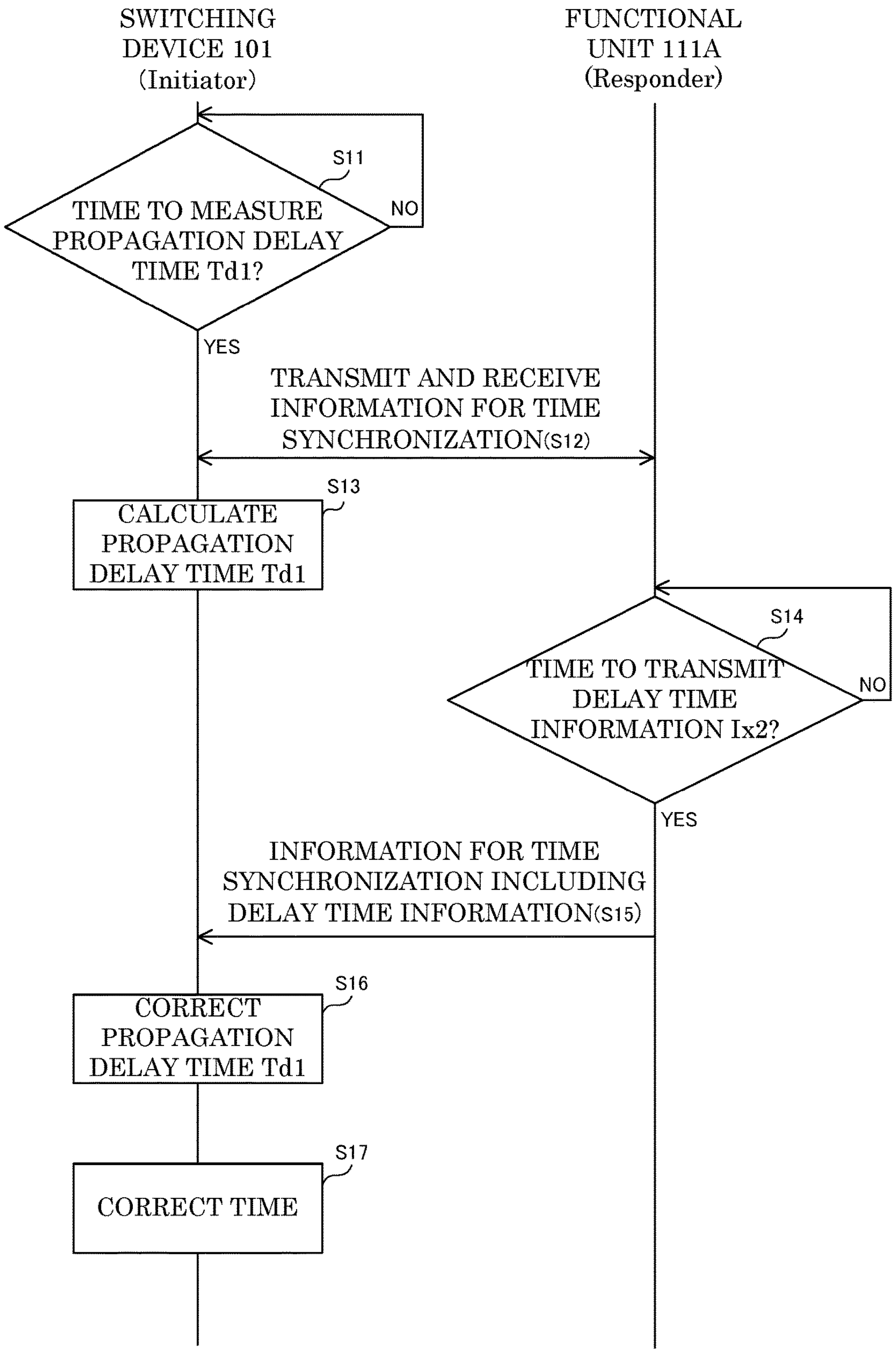
FIG. 14 is a sequence diagram defining an example of an operation procedure of time synchronization performed between on-vehicle devices according to the embodiment of the present disclosure.

FIG. 14 is a sequence diagram defining an example of an operation procedure of time synchronization performed between on-vehicle devices according to the embodiment of the present disclosure. Hereinafter, an operation procedure of time synchronization performed between the master functional unit 111A and the switching device 101 in the case of using the above-described method 1 will be described.

As shown in FIG. 14, first, the switching device 101 waits until the time to measure the propagation delay time Td1 between the switching device 101 and the functional unit 111A is reached ("NO" in step S11). Thereafter, upon the time to measure the propagation delay time Td1 being reached ("YES" in step S11), the switching device 101 transmits and receives time information, etc. to and from the functional unit 111A (step S12).

Next, the switching device 101 calculates the propagation delay time Td1 based on, for example, the transmission time and the reception time, etc. of the time information transmitted to and received from the functional unit 111A (step S13).

Next, the functional unit 111A waits until the time to transmit the delay time information Ix2 indicating: the transmission delay time T22 of data from the measurement reference position X2 of the transmission time of the data to the external position; and the transmission delay time T21 of data from the external position to the measurement reference position X2 of the reception time of the data is reached. The time to transmit the delay time information Ix2 is, for example, the time to transmit information for time synchronization including the delay time information Ix2, such as a follow-up message, after the transmission of a Sync message ("NO" in step S14).

Next, upon the time to transmit the delay time information Ix2 being reached ("YES" in step S14), the functional unit 111A includes the delay time information Ix2 in the information for time synchronization, and transmits the information to the switching device 101 (step S15).

Next, the switching device 101 corrects the propagation delay time Td1 calculated in step S13, based on the transmission delay times T21 and T22 indicated by the delay time information Ix2 transmitted from the functional unit 111A, the transmission delay time T11 of data from the measurement reference position X1 of the transmission time of the data to the external position, and the transmission delay time T12 of data from the external position to the measurement reference position X1 of the reception time of the data, indicated by the delay time information Ix1 held in the switching device 101 (step S16).

Next, the switching device 101 corrects the time in the switching device 101 based on the transmission time at the functional unit 111A of the Sync message transmitted from the functional unit 111A, the reception time thereof at the switching device 101, and the corrected propagation delay time Td1, for example. As a result, time synchronization between the functional unit 111A and the switching device 101 is established (step S17). Thereafter, the operations in step S11 and the following steps are repeated.

Time Synchronization Between Master Functional Unit and Switching Device Performed Using Method 2

Figure 15:
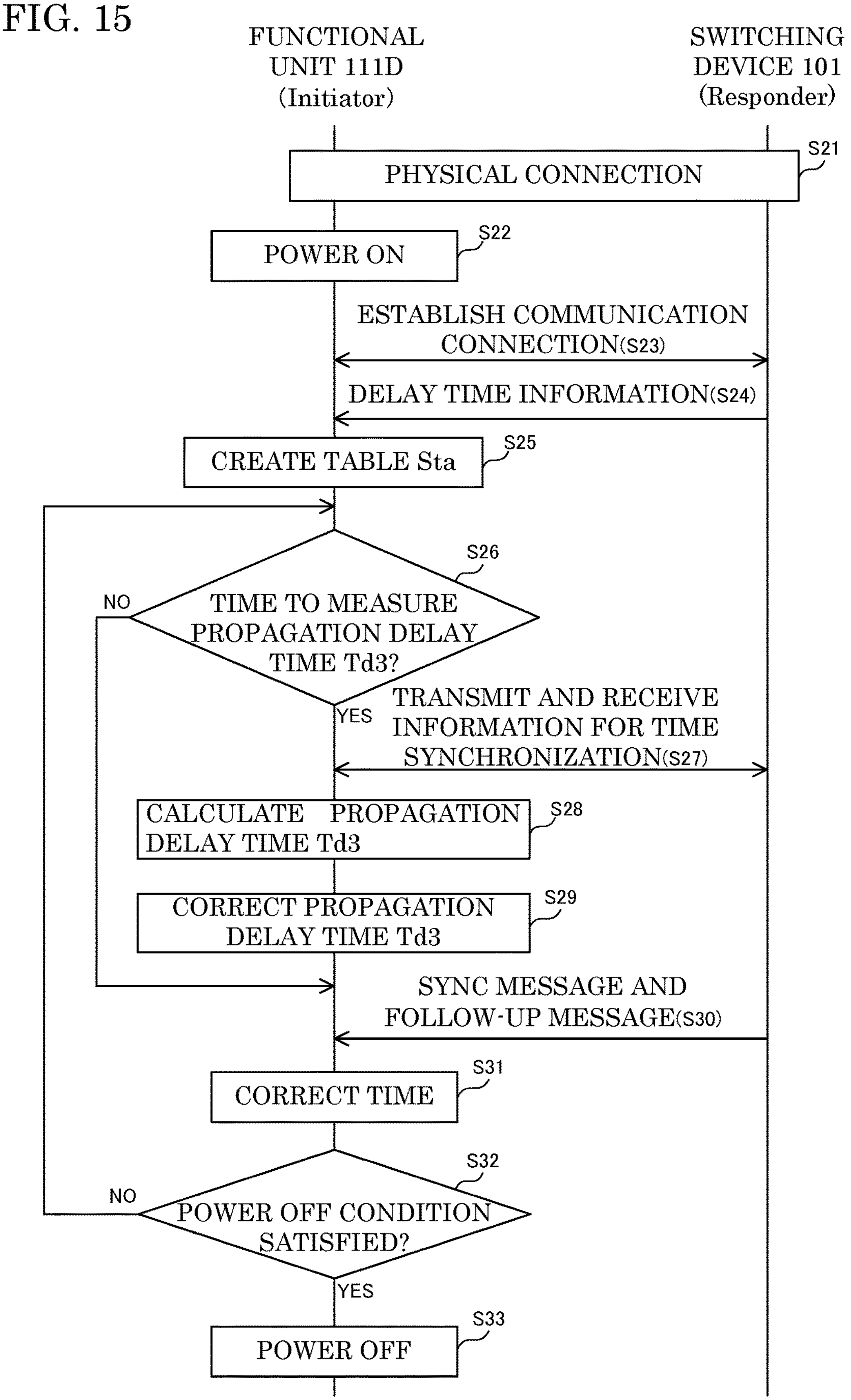
FIG. 15 is a sequence diagram defining an example of an operation procedure of time synchronization performed between on-vehicle devices according to the embodiment of the present disclosure.

FIG. 15 is a sequence diagram defining an example of an operation procedure of time synchronization performed between on-vehicle devices according to the embodiment of the present disclosure. Hereinafter, an operation procedure of time synchronization performed between the functional unit 111D newly connected to the switching device 101 and the switching device 101 in the case of using the above-described method 2 will be described.

As shown in FIG. 15, first, it is assumed that the functional unit 111D is physically connected to the communication port 54D of the switching device 101 (step S21).

Next, upon the functional unit 111D being turned on (step S22), processing is performed to establish a communication connection between the functional unit 111D and the switching device 101 (step S23).

Next, upon the communication connection with the functional unit 111D being established, the switching device 101 transmits, for example, a message that employs SOME/IP, including the delay time information Ix6 indicating: the transmission delay time T62 of data from the measurement reference position X6 of the transmission time of the data to the external position, corresponding to the communication port 54D; and the transmission delay time T61 of data from the external position to the measurement reference position X6 of the reception time of the data, corresponding to the communication port 54D, to the functional unit 111D (step S24).

Next, the functional unit 111D creates the table Sta showing the transmission delay times T61 and T62 indicated by the delay time information Ix6 transmitted from the switching device 101, the transmission delay time T51 of data from the measurement reference position X5 of the transmission time of the data to the external position, and the transmission delay time T52 of data from the external position to the measurement reference position X5 of the reception time of the data, indicated by the delay time information Ix5 held in the functional unit 111D (step S25).

Next, upon the time to measure the propagation delay time Td3 being reached ("YES" in step S26), the functional unit 111D transmits and receives information for time synchronization, such as time information, to and from the switching device 101 (step S27).

Next, the functional unit 111D calculates the propagation delay time Td3 based on, for example, the transmission time and the reception time, etc. of the time information transmitted to and received from the switching device 101 (step S28).

Next, the functional unit 111D corrects the propagation delay time Td3 calculated in step S28, based on the transmission delay times T51, T52, T61, and T62 shown in the table Sta created in step S25 (step S29).

Next, upon the time to transmit a Sync message being reached, the switching device 101 transmits a Sync message and a follow-up message to the functional unit 111D (step S30).

Next, the functional unit 111D corrects the time in the functional unit 111D thereof, based on the transmission time at the switching device 101 and the reception time at the functional unit 111D of the Sync message transmitted from the switching device 101, and the corrected propagation delay time Td3. As a result, time synchronization between the switching device 101 and the functional unit 111D is established (step S31).

Next, when a condition for switching the power of the functional unit 111D from on to off is satisfied, such as when the user performs an operation to turn off the functional unit 111D ("YES" in step S32), the functional unit 111D is turned off (step S33). On the other hand, the operations from step S26 to step S32 are repeated until the condition for switching the power of the functional unit 111D from on to off is satisfied ("NO" in step S32).

In a state where the next time to measure the propagation delay time Td3 has not been reached ("NO" in step S26), if the functional unit 111D newly receives a Sync message from the switching device 101, the functional unit 111D corrects the time in the functional unit 111D, using the corrected propagation delay time Td3 already stored therein (step S31).

The foregoing embodiments are to be construed in all respects as illustrative and not restrictive. The scope of the present invention is defined by the claims rather than the description above, and is intended to include all modifications within the meaning and scope of the claims and equivalents thereof.

The above description includes the features described in the following supplementary notes.

Supplementary Note 1

An on-vehicle device comprising:

a storage unit configured to store delay time information indicating at least either a first transmission delay time of data from a measurement reference position of a transmission time of the data in an own device, which is the on-vehicle device, to an external position, or a second transmission delay time of data from an external position to a measurement reference position of a reception time of the data in the own device; and a transmission processing unit configured to transmit the delay time information stored in the storage unit to a first other device that performs time synchronization with the own device, wherein the first other device measures a propagation delay time between the first other device and the own device in accordance with IEEE 802.1 standards by transmitting and receiving information for time synchronization to and from the own device, and performs time synchronization with the own device based on the measured propagation delay time, the delay time information includes both the first transmission delay time and the second transmission delay time, and the first other device corrects the propagation delay time based on the first transmission delay time and the second transmission delay time indicated by the delay time information from the on-vehicle device, and at least either a third transmission delay time of data from a measurement reference position of a transmission time of the data in the first other device to an external position or a fourth transmission delay time of data from an external position to a measurement reference position of a reception time of the data in the first other device, and performs time synchronization using the corrected propagation delay time.

Supplementary Note 2

An on-vehicle device comprising:

a time synchronization unit configured to measure a propagation delay time between the on-vehicle device and the other device by transmitting and receiving information for time synchronization to and from another device, which is another on-vehicle device, and perform time synchronization with the other device based on the measured propagation delay time;

a reception unit configured to receive delay time information indicating at least either a first transmission delay time of data from a measurement reference position of a transmission time of the data in the other device to an external position, or a second transmission delay time of data from an external position to a measurement reference position of a reception time of the data in the other device; and a storage unit configured to store at least either a third transmission delay time of data from a measurement reference position of a transmission time of the data in own device, which is the on-vehicle device, to an external position, or a fourth transmission delay time of data from an external position to a measurement reference position of a reception time of the data in the own device, wherein the time synchronization unit includes a correction unit configured to correct the propagation delay time measured by the time synchronization unit, based on the first transmission delay time and the second transmission delay time indicated by the delay time information transmitted from the other device, and the third transmission delay time and the fourth transmission delay time stored in the storage unit.

DESCRIPTIONS OF REFERENCE NUMERALS

1 vehicle
10 ethernet cable
51 relay unit
22,52,82 time synchronization unit (transmission processing unit)
23,53,83 storage unit
24,54,54A-54H,84 communication port
61 switching unit
62 control unit
63,91 processing unit
64,92 correction unit
21,81 communication unit
101 switching device
111,111A-111E functional unit
301 on-vehicle communication system
CM11,CP11,CM12,CP12 IC chip
CM21,CP21,CM22,CP22 IC chip
CM31,CP31,CM32,CP32 IC chip
CM41,CP41,CM42,CP42 IC chip
M11,M12,M21,M22,M31,M32,M41,M42 MAC processing unit
P11,P12,P21,P22, P31,P32, P41,P42 PHY processing unit
X1-X8 measurement reference position
L1-L8 data transmission path
Sta, Stb table

The invention claimed is:

1. An on-vehicle device comprising:

a storage unit configured to store a delay time information, the delay time indicating one of a first transmission delay time of data and a second transmission delay time of data, the first transmission delay of time being a period of time from a measurement reference position of a transmission time of the data in the on-vehicle device, to an external position, the second transmission delay time of data being a period of time from an external position to a measurement reference position of a reception time of the data in the on-vehicle device; and a transmission processing unit configured to transmit the delay time information stored in the storage unit to another device that performs time synchronization with the on-vehicle device.

2. The on-vehicle device according to claim 1, wherein the delay time information indicates both the first transmission delay time and the second transmission delay time.

3. The on-vehicle device according to claim 1, wherein each of the measurement reference positions is located between a MAC processing unit that performs MAC (Medium Access Control) layer processing and a PHY processing unit that performs PHY (Physical) layer processing.

4. The on-vehicle device according to claim 1, wherein the transmission processing unit transmits the delay time information to the first other device in response to a communication connection being established between the own device and the first other device.

5. The on-vehicle device according to claim 1, wherein the transmission processing unit transmits information for time synchronization including the delay time information.

6. The on-vehicle device according to claim 1, wherein the on-vehicle device further includes:

a time synchronization unit configured to measure a propagation delay time between the on-vehicle device and the second other device by transmitting and receiving information for time synchronization to and from a second other device, and perform time synchronization with the second other device based on the measured propagation delay time, and the time synchronization unit includes a correction unit configured to correct the propagation delay time based on delay time information indicating at least either a third transmission delay time of data from a measurement reference position of a transmission time of the data in the second other device to an external position, transmitted from the second other device, or a fourth transmission delay time of data from an external position to a measurement reference position of a reception time of the data in the second other device.

7. A time synchronization method of an on-vehicle device, comprising the steps of:

acquiring delay time information indicating one of a first transmission delay time of data and a second transmission delay of time being a period of time from a measurement reference position of a transmission time of the data in the on-vehicle device, to an external position, the second transmission delay time of data being a period of time from an external position to a measurement reference position of a reception time of the data in the on-vehicle device;

storing the acquired delay time information in a storage unit; and transmitting the acquired delay time information stored in the storage unit to another device that performs time synchronization with the on-vehicle device.

8. A time synchronization method in an on-vehicle communication system that includes a first on-vehicle device and a second on-vehicle device, the method comprising:

a step in which the first on-vehicle device transmits delay time information indicating one of a first transmission delay time of data and a second transmission delay time of data, the first transmission delay of time being a period of time from a measurement reference position of a transmission time of the data in the first on-vehicle device to an external position, the second transmission delay time of data being a period of time from an external position to a measurement reference position of a reception time of the data in the first on-vehicle device; a step in which the second on-vehicle device receives the delay time information transmitted from the first on-vehicle device;

a step in which the second on-vehicle device measures the propagation delay time between the second on-vehicle device and the first on-vehicle device by transmitting and receiving information for time synchronization to and from the first on-vehicle device;

a step in which the second on-vehicle device corrects the measured propagation delay time based on the delay time information received from the first on-vehicle device; and a step in which the second on-vehicle device performs time synchronization with the first on-vehicle device based on the corrected propagation delay time.

* * * * *